US011932817B1

United States Patent
Snell et al.

(10) Patent No.: US 11,932,817 B1
(45) Date of Patent: Mar. 19, 2024

(54) AROMAX® PROCESS FOR IMPROVED SELECTIVITY AND HEAVIER FEEDS PROCESSING

(71) Applicant: Chevron Phillips Chemical Company LP, The Woodlands, TX (US)

(72) Inventors: Ryan W. Snell, Jubail Industrial (SA); Vincent D. McGahee, Kemah, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/168,356

(22) Filed: Feb. 13, 2023

(51) Int. Cl.
*C10G 59/02* (2006.01)
*B01J 8/00* (2006.01)
*B01J 8/04* (2006.01)

(52) U.S. Cl.
CPC ............ *C10G 59/02* (2013.01); *B01J 8/001* (2013.01); *B01J 8/0496* (2013.01); *B01J 2208/00106* (2013.01); *B01J 2208/00628* (2013.01)

(58) Field of Classification Search
CPC ......... C10G 59/02; B01J 8/001; B01J 8/0496; B01J 2208/00106; B01J 2208/00628
See application file for complete search history.

(56) References Cited

U.S. PATENT DOCUMENTS

| | | | |
|---|---|---|---|
| 2,287,931 A | 6/1942 | Corson | |
| 2,409,695 A | 10/1946 | Laughlin | |
| 3,761,392 A | 9/1973 | Pollock | |
| 3,883,418 A | 5/1975 | Drehman | |
| 4,648,961 A | 3/1987 | Jacobson | |
| 4,872,967 A * | 10/1989 | Clem | C10G 61/02 208/65 |
| 5,203,988 A * | 4/1993 | Swan, III | C10G 59/02 208/65 |
| 5,401,386 A | 3/1995 | Morrison | |
| 5,877,367 A | 3/1999 | Witte | |
| 6,051,128 A | 4/2000 | Nacamuli | |
| 6,143,166 A | 11/2000 | Nacamuli | |
| 8,419,929 B2 | 4/2013 | Ding | |
| 8,658,021 B2 | 2/2014 | Chen | |
| 8,679,321 B2 | 3/2014 | Negiz | |
| 9,085,736 B2 | 7/2015 | Morrison | |
| 9,718,042 B2 | 8/2017 | Demmelmaier | |

FOREIGN PATENT DOCUMENTS

EP 335540 A 10/1989
FR 3014894 B1 2/2017

* cited by examiner

Primary Examiner — Randy Boyer
Assistant Examiner — Juan C Valencia
(74) Attorney, Agent, or Firm — Conley Rose, P.C.

(57) ABSTRACT

The present disclosure generally relates to systems, methods, and processes for catalytic hydrocarbon reformation.

20 Claims, 3 Drawing Sheets

AROMAX® PROCESS FOR IMPROVED SELECTIVITY AND HEAVIER FEEDS PROCESSING

TECHNICAL FIELD

The present disclosure generally relates to systems, methods, and processes for catalytic hydrocarbon reformation.

BACKGROUND

The catalytic conversion of hydrocarbons into aromatic compounds, referred to as aromatization or reforming, is an important industrial process. Reforming reactions are intended to convert paraffins, naphthenes, and olefins to aromatics and hydrogen. The reforming process encompasses a number of reactions, which are typically performed in the presence of a catalyst, such as dehydrocyclization, hydrodecyclization, isomerization, hydrogenation, dehydrogenation, hydrocracking, cracking, etc. Typical reforming processes can be performed using a variety of reactors containing reforming or 'aromatization' catalysts. The catalyst may increase the reaction rates, production of desired aromatic product(s), and/or throughput rates for the desired aromatic compounds. Conventionally, a hydrocarbon feed to be reformed is combined with hydrogen before feeding it to a first reactor in a series of a plurality of (e.g., six or seven) reforming reactors. As the feed passes through the reactor train, the reaction progresses, thus generating aromatic products and hydrogen.

Given the commercial importance thereof, an ongoing need exists for improved systems and methods for catalytic reforming.

SUMMARY

The present disclosure generally relates to systems, methods, and processes for catalytic hydrocarbon reformation. In some aspects, the disclosure provides for a process for operating a reforming reactor system, the process comprising: operating a first series of reactors, wherein the first series of reactors comprises a plurality of reactors, and wherein each reactor within the plurality of reactors in the first series of reactors contains a catalyst capable of catalyzing the reaction of at least a portion of hydrocarbons in a hydrocarbon feed into aromatic hydrocarbons, thus providing a first reactor series effluent comprising the aromatic hydrocarbons, unreacted hydrocarbons, and hydrogen; separating hydrogen from the first reactor series effluent, thus providing hydrogen and a reduced-hydrogen first reactor series effluent; and operating a second series of reactors, wherein the second series of reactors comprises a plurality of reactors, and wherein each reactor within the plurality of reactors in the second series of reactors contains a catalyst capable of catalyzing the reaction of at least a portion of the unreacted hydrocarbons in the reduced-hydrogen first reactor series effluent into the aromatic hydrocarbons. In embodiments, the process further comprises operating at least one of the reactors within the plurality of reactors in the first series of reactors at a lower severity than at least one of the reactors within the plurality of reactors in the second series of reactors, such that the lower severity may comprise a lower average catalyst bed temperature, or a lower reactor endotherm for at least one reactor of the plurality of reactors in the first series of reactors over the course of a run that is at least 40° C. less than an average catalyst bed temperature, or a lower reactor endotherm for at least one reactor within the plurality of reactors in the second series of reactors over the course of the run. In related embodiments, the process may be associated with a fouling rate of the catalyst in any one of the reactors within the plurality of reactors in the first series of reactors that is less than a fouling rate of the catalyst in any one of the reactors within the plurality of reactors in the second series of reactors.

The process may be characterized by, in some aspects, a hydrocarbon feed that comprises greater than about 10 volume percent (10 vol. %) of hydrocarbons containing eight or more carbon atoms, which may be represented herein as $C_8^+$. In certain embodiments, the process may comprise a molar ratio of hydrogen to hydrocarbon in at least one of the reactors within the plurality of reactors of the second series of reactors that is less than a molar ratio of hydrogen to hydrocarbon in a corresponding reactor of a process employing a reforming reactor system comprising a single series of reactors operated without inter-series hydrogen separation, including a molar ratio of hydrogen to hydrocarbon in a final reactor of the second series of reactors that is less than about 3:1, at constant conversion, and wherein the molar ratio of hydrogen to hydrocarbon to a first reactor of the first series of reactors is in the range of from about 1.5:1 to about 2:1. Additional aspects of the process may be characterized by a partial pressure of hydrogen in at least one of the reactors within the plurality of reactors of the second series of reactors that is less than a partial pressure of hydrogen in a corresponding reactor of a process employing a reforming reactor system comprising a single series of reactors operated without an inter-series hydrogen separation as described herein. The process may, in embodiments, be further characterized by a selectivity to benzene, toluene, and xylenes (BTX) that is greater than the comparative selectivity to BTX provided by an equivalent process employing a reforming reactor system comprising a single series of reactors operated in the absence of any inter-series hydrogen separation, in accordance with the instant disclosure.

In some embodiments, the process utilizes a catalyst that comprises at least one Group VIII metal and a zeolitic support, where the Group VIII metal may comprise platinum (and/or another Group VIII metal, such as ruthenium, rhodium, palladium, osmium, and/or iridium) and the zeolitic support may comprise a silica-bound L-zeolite. In addition, the catalyst may further comprise at least one halide, such as chloride, fluoride, bromide, iodide, or combinations thereof. The process may further comprise a reduced-hydrogen first reactor series effluent that comprises a non-convertible $C_6$ hydrocarbon, and may further comprise separating the non-convertible $C_6$ hydrocarbon from the reduced-hydrogen first reactor series effluent to produce a second hydrocarbon stream, and introducing the second hydrocarbon stream to the second series of reactors via a charge pump, with the second hydrocarbon stream comprising a greater concentration of convertible $C_6$ hydrocarbons than the reduced-hydrogen first reactor series effluent.

The process comprises, in further aspects, heating the second hydrocarbon stream via a heat exchange with the first reactor series effluent prior to the introduction of the second hydrocarbon stream into the second series of reactors, and prior to the separation of hydrogen from the first reactor series effluent. In further embodiments, the process comprises separating a second hydrocarbon stream, wherein $C_5^-$ hydrocarbons are separated from the reduced-hydrogen first reactor series effluent to provide a $C_5^+$ product, separating $C_7^+$ from the $C_5^+$ product to provide a $C_{6-}$ product, extracting benzene from the $C_{6-}$ product to provide a benzene-reduced product, and separating dimethylbutanes (DMBs) from the benzene-reduced product to provide the second hydrocarbon stream.

In some aspects, the disclosure provides for a reforming reactor system comprising a first reactor series comprising a plurality of reactors, where each of the reactors within the plurality of reactors of the first reactor series contains a catalyst capable of catalyzing the reaction of at least a portion of a hydrocarbon in a hydrocarbon feed into an aromatic hydrocarbon, providing a first reactor series effluent comprising the aromatic hydrocarbon, unreacted hydrocarbon, and hydrogen; further providing a low-pressure separator configured to separate hydrogen from the first reactor series effluent to produce/supply hydrogen and a reduced-hydrogen first reactor series effluent; and providing a second reactor series comprising a plurality of reactors, where each reactor of the second reactor series contains a catalyst capable of catalyzing the reaction of at least a portion of the unreacted hydrocarbon in the reduced-hydrogen first reactor series effluent into the aromatic hydrocarbon.

The system of the instant disclosure may further comprise, in embodiments, a catalyst comprises platinum, a silica-bound L-zeolite support, and at least one halogen, as further disclosed herein, and may additionally comprising an apparatus configured to separate a non-convertible $C_6$ hydrocarbon from the reduced-hydrogen first reactor series effluent capable of producing a second hydrocarbon stream characterized by a greater concentration of convertible $C_6$ hydrocarbons as compared to the reduced-hydrogen, first reactor series effluent and characterized by the presence of one or more of (a) a charge pump operable to introduce the second hydrocarbon stream to the second reactor series; and/or (b) a heat exchange apparatus configured to transfer heat between the second hydrocarbon stream and the first reactor series effluent prior to the introduction of the second hydrocarbon stream into the second reactor series, and prior to separating hydrogen from the first reactor series effluent via the hydrogen separation apparatus.

In some aspects, the disclosure relates to a process for operating a reforming reactor system comprising operating a plurality of reactors in a reactor series to produce a reactor series effluent comprising an aromatic hydrocarbon from a hydrocarbon feed comprising a hydrocarbon, where the operating the plurality of reactors comprises directing a portion of the hydrocarbon feed to form a supplemental feed, introducing the supplemental feed into at least one reactor downstream of the first reactor in the reactor series and bypassing the first reactor with the portion of the hydrocarbon feed, and introducing a remainder portion of the hydrocarbon feed into the first reactor of the reactor series, where each of the reactors within the plurality of reactors contains a catalyst capable of catalyzing the reaction of at least a portion of the hydrocarbon in the hydrocarbon feed into the aromatic hydrocarbon for producing the reactor series effluent. In further embodiments, each reactor of the reactor series in the disclosed process may positioned beside and preceded by an associated furnace, and the supplemental feed may be introduced upstream of the furnace preceding a downstream reactor into which the supplemental feed is introduced, as well as embodiments where operating the plurality of reactors further comprises introducing the supplemental feed directly upstream of each furnace associated with each reactor downstream of the first reactor.

The process may further comprise embodiments associated with controlling a portion of the supplemental feed that is introduced to each reactor positioned downstream of the first reactor, such that an influent to each reactor of the plurality of reactors has a controlled and desired molar ratio of hydrogen to hydrocarbon, of hydrogen to hydrocarbon, or both. In additional aspects, the desired molar ratio of the influent is less than about 3:1, and may further include embodiments where the ratio resides in a range of from about 1.5:1 to about 2:1. The process may further be characterized by aspects where a portion of the hydrocarbon feed is effectively directed upstream of a sulfur removal apparatus, and/or introducing the remainder of the hydrocarbon feed to the sulfur removal apparatus prior to its introduction into the first reactor.

The process may also comprise embodiments directed to the separation of hydrogen from the reactor series effluent, and combining a portion of the separated hydrogen with the remainder portion of the hydrocarbon feed, after compressing the separated hydrogen, such that the combination provides a first reactor feed having a molar ratio of hydrogen to hydrocarbon in the range of from about 1.5:1 to about 2.0:1. In some embodiments, compressing the separated hydrogen and combining the portion of the separated hydrogen with the remainder portion of the hydrocarbon feed, after compressing the separated hydrogen, beneficially requires less compressor capacity than an equivalent process employing a reforming reactor system in which all of the hydrocarbon feed is introduced into the first reactor of the reactor series. The process may be further characterized by embodiments where the catalyst activity, the selectivity to $C_5^+$, or both are enhanced relative to an equivalent process in which a portion of the hydrocarbon feed is not introduced downstream of the first reactor in the reactor series. Additional, non-limiting aspects of the process further comprise removing a non-convertible hydrocarbon from the reactor series effluent to produce a second hydrocarbon stream, and recycling the second hydrocarbon stream to the reactor series as a portion of the hydrocarbon feed that bypasses the first reactor, and still further comprising subjecting the entirety of the remainder portion of the hydrocarbon feed introduced into the first reactor of the reactor series to sulfur removal treatment. The process may also comprise a catalyst comprising at least one Group VIII metal, a zeolitic support, and optionally a halogen, including but not limited to catalysts comprising platinum, a silica-bound L-zeolite, and at least one halogen.

In aspects, the present disclosure provides for a reforming reactor system comprising a reactor series comprising a plurality of reactors, where each reactor of the plurality of reactors contains a catalyst capable of catalyzing the reaction of at least a portion of a hydrocarbon in a hydrocarbon feed into an aromatic hydrocarbon for producing a reactor series effluent comprising the aromatic hydrocarbon; and a piping arrangement or configuration characterized by a bypass portion of the hydrocarbon feed capable of bypassing a first reactor of the reactor series for introduction into at least one reactor downstream of the first reactor of the reactor series, where the bypass portion of the hydrocarbon feed bypasses the first reactor, and a remainder portion of the hydrocarbon feed is introduced into the first reactor. In further aspects, the system provides for a low-pressure separator configured to separate hydrogen from the reactor series effluent, and a compressor configured to compress the separated hydrogen and provide compressed hydrogen such that the combination of the compressed hydrogen with the remainder portion of the hydrocarbon feed provides a molar ratio of hydrogen to hydrocarbon in a feed to the first reactor in the range of from about 1.5:1 to about 2.0:1. In additional embodiments, the piping arrangement may be configured to divert the bypass portion of the hydrocarbon feed upstream of a sulfur removal apparatus that is configured to remove sulfur compounds from the remainder portion of the hydrocarbon feed.

BRIEF DESCRIPTION OF THE DRAWINGS

The following figures illustrate embodiments of the subject matter disclosed herein. The claimed subject matter may be understood by reference to the following description taken in conjunction with the accompanying figures, in which like reference numerals identify like elements, unless otherwise indicated.

DETAILED DESCRIPTION

Figure 1:
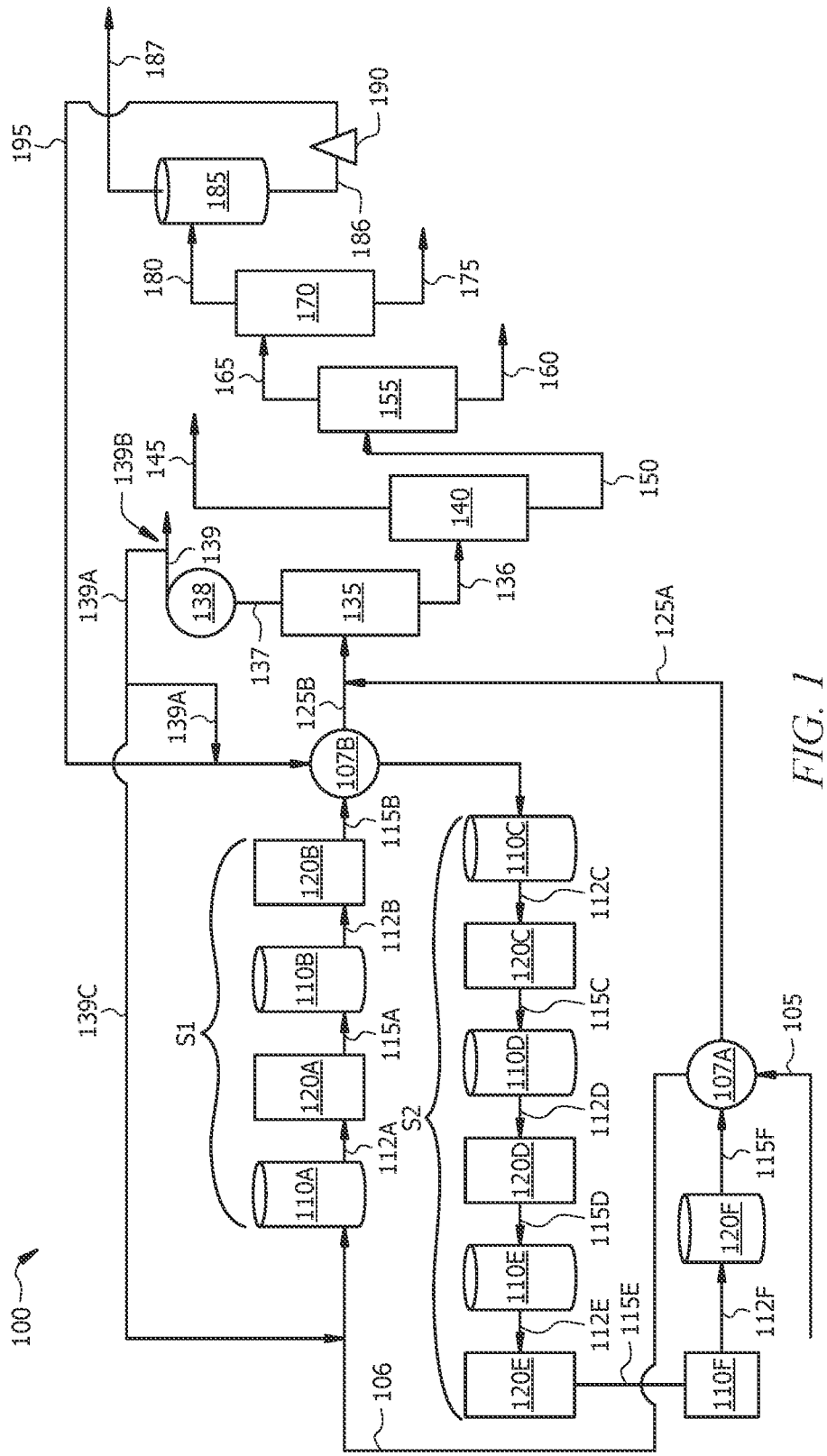
FIG. 1 is a schematic of a reforming system according to certain aspects of the present disclosure.

Reforming or 'aromatization' processes, such as the AROMAX® process developed by Chevron Phillips Chemical Company LLC, can convert light $C_6$-$C_8$ naphtha in a selective fashion to BTX (benzene, toluene, and xylenes). The feed generally contains compounds such as n-hexane, n-heptane, methyl hexane, etc., which have a six-carbon chain available to ring close and subsequently form the benzene, toluene, or xylene. There are also a number of species like methyl pentanes which can cyclize to methyl cyclopentane before undergoing ring opening to form n-hexane. However, a small but potentially significant amount of the feed consists of compounds like dimethylbutanes and trimethylpentanes which would have to undergo substantial isomerization before being aromatized. These species are therefore classified as 'non-convertibles' since they will not end up as BTX. Unfortunately, these highly branched non-convertibles tend to crack quite easily, which lowers $C_{5+}$ yield. As these species have a good octane number and can be utilized in mogas (motor gasoline), cracking significantly lowers the value thereof. Longer molecules, such as n-octane or nonane, may also be readily converted over a reforming catalyst (e.g., the AROMAX® catalyst). In fact, longer species tend to be easier to aromatize, allowing for this conversion to take place at lower temperatures. However, the resulting aromatics, containing methyl, ethyl, and propyl substituents, may be cracked to make fuel gas and benzene, thus decreasing value.

Controlling hydrogen partial pressure in reforming reactors, and thus making the hydrogen partial pressure more consistent, and/or decreasing the cracking of non-convertibles and/or substituted aromatics therein as described hereinbelow, may provide benefits.

In accordance with aspects of this disclosure, the reforming reaction can be enhanced by staggering the hydrocarbon feed introduction locations, and/or via intermediate removal of branched non-convertibles, substituted aromatics, and/or hydrogen. As described in more detail hereinbelow, the staggering of the hydrocarbon feed introduction, the intermediate removal of hydrogen, or both can operate to reduce the hydrogen partial pressure, thus enhancing selectivity and/or reducing undesired cracking. In addition, the intermediate removal of branched non-convertibles, of substituted aromatics, or both, can also beneficially reduce cracking.

As utilized herein, 'convertible' hydrocarbons include hydrocarbons having six or seven carbon atoms without an internal quaternary carbon, and hydrocarbons having six carbon atoms without two adjacent internal tertiary carbons. Such convertible hydrocarbons may comprise methylpentanes, methylhexanes, dimethylpentanes, and mixtures thereof. The convertible components may include 2-methylpentane, 3-methylpentane, 2,4-dimethylpentane, 2,3-dimethylpentane, n-hexane, 2-methylhexane, 3-methylhexane, n-heptane, and mixtures thereof. As utilized herein, 'non-convertible' hydrocarbons include highly branched hydrocarbons comprising six or seven carbon atoms with an internal quaternary carbon, and hydrocarbons having six carbon atoms and two adjacent tertiary carbons. The highly branched hydrocarbons include dimethylbutanes (DMBs), trimethylbutanes, dimethylpentanes, and mixtures thereof. The highly branched hydrocarbons with six or seven carbon atoms with an internal quaternary carbon may comprise, for example, 2,2-dimethylbutane, 2,2-dimethylpentane, 3,3-dimethylpentane, 2,2,3-trimethylbutane, and combinations thereof. The highly branched hydrocarbons with six carbon atoms and an adjacent internal tertiary carbon atom may comprise 2,3-dimethylbutane. The highly branched hydrocarbons do not easily convert to aromatic products and instead tend to convert to light hydrocarbons. As used herein, 'unreacted' hydrocarbon refers to convertible hydrocarbon that has passed through a reforming reactor series without being converted into aromatic hydrocarbons.

The disclosure provides for a reforming system operable to provide consistent hydrogen partial pressure within one or more reforming reactors of one or more series of such reactors, and/or to reduce undesirable cracking within such reforming reactors. In embodiments, the herein-disclosed reforming reactor system comprises a reactor series comprising a plurality of reactors, including a first reactor and a last reactor, wherein each reactor within the plurality of reactors contains a catalyst capable of catalyzing the reaction of at least a portion of a hydrocarbon in a hydrocarbon feed into an aromatic hydrocarbon, thus providing a reactor effluent comprising the aromatic hydrocarbon, unreacted hydrocarbon, and hydrogen; and (a) a low pressure separator configured to separate hydrogen from an effluent of at least one reactor upstream of the last reactor, thus providing hydrogen and a reduced-hydrogen effluent, whereby at least a portion of the reduced-hydrogen effluent can be introduced into a reactor downstream of the at least one reactor; (b) piping configured such that a bypass portion of the hydrocarbon feed can bypass the first reactor of the reactor series and be introduced into at least one reactor downstream of the first reactor, whereby the bypass portion of the hydrocarbon feed bypasses the first reactor, and wherein a remainder portion of the hydrocarbon feed is introduced into the first reactor; or both (a) and (b).

In embodiments, a system of this disclosure comprises a reactor series comprising a plurality of reactors, including a first reactor and a last reactor, wherein each reactor within the plurality of reactors contains a catalyst capable of catalyzing the reaction of at least a portion of a hydrocarbon in a hydrocarbon feed into an aromatic hydrocarbon, thus providing a reactor effluent comprising the aromatic hydrocarbon, unreacted hydrocarbon, and hydrogen; and (a) a low pressure separator configured to separate hydrogen from an effluent of at least one reactor upstream of the last reactor, thus providing hydrogen and a reduced-hydrogen effluent, whereby at least a portion of the reduced-hydrogen effluent can be introduced into a reactor downstream of the at least one reactor. Thus, in embodiments, a system of this disclosure comprises a separator configured for the intermediate (i.e., downstream of the 1$s$t reforming reactor in the series and prior to the final/last reforming reactor) removal of hydrogen. In embodiments, such a system comprises a first reactor series comprising a plurality of reactors, wherein each of the reactors within the plurality of reactors of the first reactor series contains a catalyst capable of catalyzing the reaction of at least a portion of a hydrocarbon in a hydrocarbon feed into an aromatic hydrocarbon, thus providing a first reactor series effluent comprising the aromatic hydrocarbon, unreacted hydrocarbon, and hydrogen; a low pressure separator configured to separate hydrogen from the first reactor series effluent, thus providing hydrogen and a reduced-hydrogen first reactor series effluent; and a second reactor series comprising a plurality of reactors, wherein each of the reactors within the plurality of reactors of the second reactor series contains a catalyst capable of catalyzing the reaction of at least a portion of the unreacted hydrocarbon in the reduced-hydrogen first reactor series effluent into the aromatic hydrocarbon.

Such a system will now be described with reference to FIG. 1, which is a schematic of a reforming system 100 according to an embodiment of the present disclosure. System 100 comprises six reforming reactors, 120A, 120B, 120C, 120D, 120E, and 120F, and separator 135. Although shown with six reforming reactors in the embodiments of FIGS. 1 and 2, it is to be understood that a reforming system according to this disclosure can comprise more or fewer than six reforming reactors. For example, in embodiments, a reforming system according to this disclosure comprises seven, eight, or more reforming reactors. In other embodiments, a reforming system according to this disclosure can comprise five, four, or three reforming reactors. A reforming system of this disclosure can further comprise one or more furnaces, sulfur removal apparatus, stabilizers, $C_6/C_7$ splitters, extractive distillation units (EDUs), dimethyl butane (DMB) columns, pumps, compressors, and/or heat exchangers, as will be described in more detail hereinbelow. Reforming system 100 comprises furnaces 110A, 110B, 110C, 110D, 110E, and 110F, stabilizer 140, $C_6/C_7$ splitter 155, EDU 170, DMB column 185, pump 190, feed/effluent heat exchanger 107A, intermediate effluent heat exchanger 107B, and compressor 138. The various components of the reforming systems described herein, e.g., as shown in FIGS. 1 and 2, may be in fluid communication via appropriate piping, conduits, valves, etc.

The herein-disclosed reforming system comprises a series of reforming reactors. As is generally understood, a reforming "reaction," typically takes place within a reforming "reactor." The reforming reactor employed in the system and method described herein may be any conventional type of reactor that maintains a catalyst within the reactor and can accommodate a continuous flow of hydrocarbon. The catalytic reactor system described herein may comprise a fixed catalyst bed system, a moving catalyst bed system, a fluidized catalyst bed system, or combinations thereof. Suitable reactors may include, but are not limited to, fixed bed reactors including radial flow reactors, bubble bed reactors, and ebullient bed reactors. The flow of the feed can be upward, downward, or radially through the reactor(s). In various embodiments, the catalytic reactor system described herein may be operated as an adiabatic catalytic reactor system or an isothermal catalytic reactor system. As used herein, a "hydrocarbon stream" comprises hydrocarbons, though components other than molecules comprising hydrogen and carbon may be present in the stream (e.g., hydrogen gas). In some embodiments, a "hydrocarbon" may comprise individual molecules that comprise one or more atoms other than hydrogen and carbon (e.g., nitrogen, oxygen, etc.).

Figure 2:
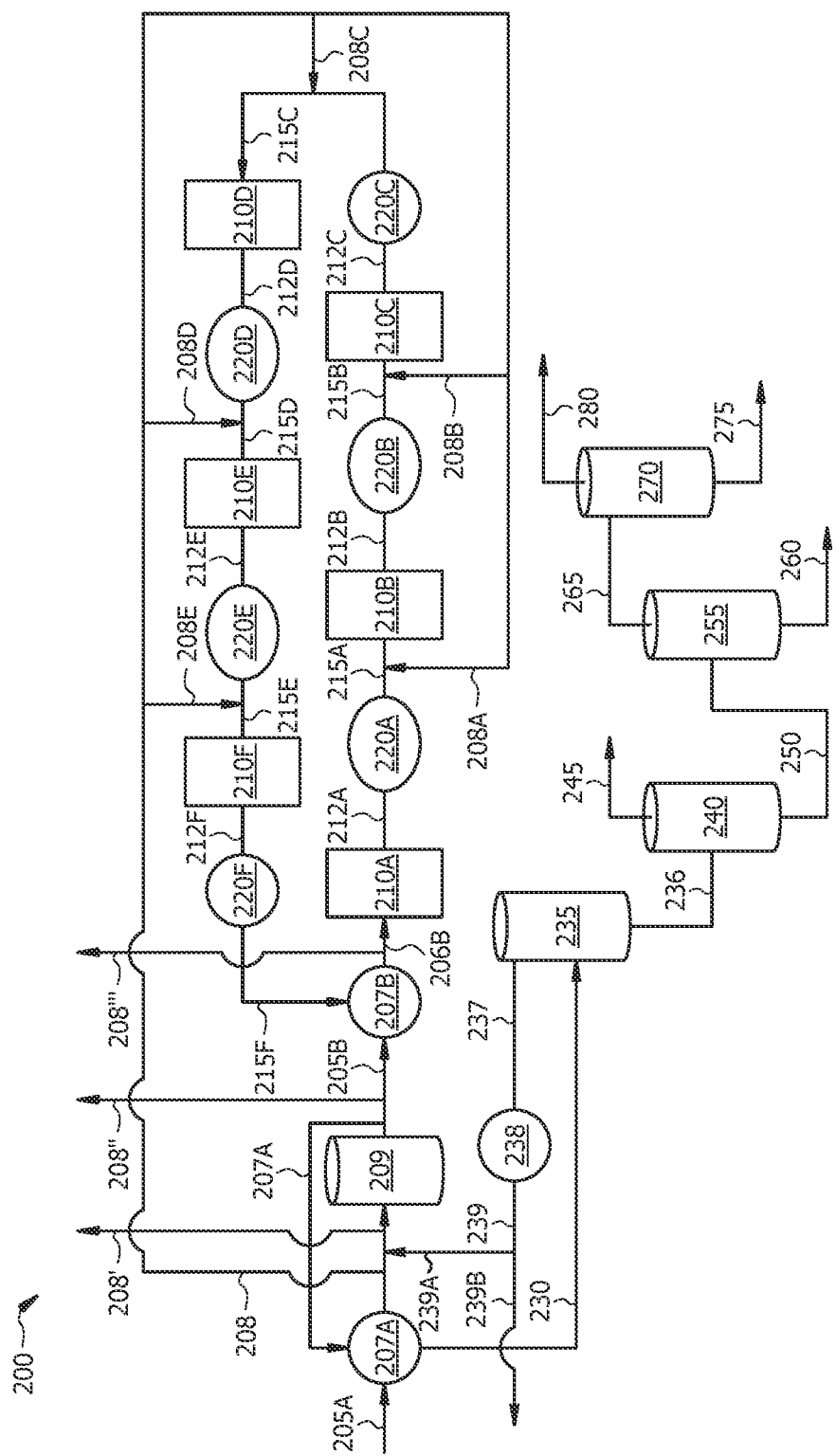
FIG. 2 is a schematic of a reforming system according to further aspects of the present disclosure.

As shown in FIG. 1, reforming system 100 generally comprises a plurality of reactors 120A, 120B, 120C, 120D, 120E, and 120F arranged in series, with associated furnaces 110A, 110B, 110C, 110D, 110E, and 110F located upstream of each reactor, respectively. The combination of a furnace coupled to a downstream reactor may be referred to throughout the present specification as a "reactor-furnace pair." The furnaces 110A, 110B, 110C, 110D, 110E, and 110F may comprise any type of furnace capable of raising the temperature of the reactant stream to achieve the desired inlet temperature to the associated or 'paired' downstream reforming reactor. Due to the endothermic nature of the reforming process, the temperature of the feedstream introduced into each reactor generally needs to be raised so that the reforming reactions may be properly performed in the reactors.

The reactor series may consist of a plurality of reactor-furnace pairs. In an embodiment, the reactor series comprises three or more serially connected reactors. All of the reactors 120A, 120B, 120C, 120D, 120E, and 120F can be the same or different in size or configuration. In an embodiment, all of the reactors 120A, 120B, 120C, 120D, 120E, and 120F are radial flow reactors with the hydrocarbon stream passing through the reactors in inward or outward flow. In an embodiment, the reactors may be sized according to known techniques, and all of the reactors may be the same size. Alternatively, one or more reactors may be present at different sizes. The reactor series may be referred to as a first series of reactors upstream of the hydrogen separation, and a second series downstream of the hydrogen separation. For example, in the embodiment of FIG. 1, a first series of reactors, S1, comprises reforming reactors 120A and 120B, with associated furnaces 110A, and 110B, respectively, while the second reactor series, S2, comprises reforming reactors 120C, 120D, 120E, and 120F, with associated furnaces 110C, 110D, 110E, and 110F, respectively.

In the embodiment of FIG. 1, first furnace 110A is fluidly connected with first reforming reactor 120A via line 112A, first reforming reactor 120A is fluidly connected with second furnace 110B via line 115A, second furnace 110B is fluidly connected with second reforming reactor 120B via line 112B, second reactor 120B is fluidly connected with intermediate effluent heat exchanger 107B (described further hereinbelow) via line 115B, third furnace 110C is fluidly connected with third reforming reactor 120C via line 112C, third reforming reactor 120C is fluidly connected with fourth furnace 110D via line 115C, fourth furnace 110D is fluidly connected with fourth reforming reactor 120D via line 112D, fourth reforming reactor 120D is fluidly connected with fifth furnace 110E via line 115D, fifth furnace 110E is fluidly connected with fifth reforming reactor 120E via line 112E, fifth reforming reactor 120E is fluidly connected with sixth furnace 110F via line 115E, sixth furnace 110F is fluidly connected with sixth reforming reactor 120F via line 112F, sixth reforming reactor 120F is fluidly connected with feed/effluent heat exchanger 107A via line 115F.

In embodiments, due to the removal of components between the first and second series of reactors as disclosed herein, one or more reactors of the second series of reactors (i.e., one or more of the reactors downstream of the hydrogen separation) may be smaller than the corresponding reactors of a conventional reforming reactor series in which hydrogen and component removal is performed on solely the effluent of the final reforming reactor of the system. In embodiments, any one of the reactors within the plurality of reactors in the second series of reactors (i.e., any one of the reactors downstream of the hydrogen separation) has a smaller volume than a corresponding reactor in a series of an equivalent reforming reactor system comprising a single series of reactors operated in a process with the same feed rates, without inter-reactor hydrogen separation. As used herein, "inter-stage," "inter-reactor," and "inter-series" are utilized to mean between reactors of a plurality of reforming reactors (e.g., located between the first reactor and the last reactor in a reactor series of a reforming system), as opposed to solely downstream of a final reforming reactor of a reforming reactor system.

In embodiments, the amount of catalyst employed in each reactor of the reforming system is more consistent than the amount of catalyst employed in reforming reactors of a conventional reforming system employing a single series with the same total number of reactors, without inter-stage hydrogen separation. For example, in embodiments, each reactor of the first series of reactors and each reactor of the second series of reactors contains a volume percentage of a total volume of catalyst, wherein the total volume of catalyst comprises a sum of the volume of catalyst in each of the plurality of reactors of the first series of reactors in addition to the sum of the volume of catalyst in each of the plurality of reactors of the second series of reactors, and the standard deviation of the volume percentages of the total volume of catalyst in the plurality of reactors in the first series of reactors and the plurality of reactors in the second series of reactors is less than a standard deviation of volume percentages of a total volume of catalyst in a process employing an otherwise equivalent reforming reactor system comprising a single series of reactors operated without inter-series hydrogen separation. By way of nonlimiting example, if a conventional reforming system comprises six reactors, wherein the first, second, third, fourth, fifth, and sixth reactors utilize 10, 10, 10, 20, 20, and 30 volume percent of the total catalyst, respectively, the first through sixth reactors of a system according to this disclosure may comprise 15, 15, 15, 15, 20, 20 volume percent of the total catalyst, or any other arrangement providing a lower standard deviation of the volume percentages of catalyst among the reactors.

In embodiments, reforming reactors 120A, 120B, 120C, 120D, 120E, and 120F each contain a catalyst for carrying out a reforming process. As is known to those of ordinary skill in the art, a suitable reforming catalyst (also referred to herein as a 'dehydrocyclization' catalyst) is capable of converting at least a portion of aliphatic, alicyclic, and/or naphthenic hydrocarbons (e.g., non-aromatic hydrocarbons) in a hydrocarbon stream to aromatic hydrocarbons. Any catalyst capable of performing a reforming reaction may be used alone or in combination with additional catalytic materials in the reactors. Suitable catalysts may include acidic or non-acidic catalysts. In an embodiment, the catalyst is a non-acidic catalyst. In embodiments, the catalyst comprises at least one Group VIII metal and a zeolitic support. In embodiments, the Group VIII metal comprises platinum, and the zeolitic support comprises silica-bound L-zeolite. In embodiments, the catalyst further comprises at least one halogen. A suitable non-acidic catalyst may comprise a non-acidic zeolite support, at least one group VIII metal, and one or more halides. Suitable halides include chloride, fluoride, bromide, iodide, or combinations thereof. Suitable Group VIII metals include iron, cobalt, nickel, ruthenium, rhodium, palladium, osmium, iridium, platinum, or combinations thereof. Examples of catalysts suitable for use with the catalytic reactor system described herein are ARO-MAX® catalysts available from the Chevron Phillips Chemical Company LP (The Woodlands, TX), and those discussed in U.S. Pat. Nos. 6,812,180 and 7,153,801, each of which is hereby incorporated herein by reference in its entirety for all purposes not contrary to this disclosure.

The catalyst supports for use with the disclosed technology can generally include any inorganic oxide. These inorganic oxides may include bound large pore aluminosilicates (zeolites), amorphous inorganic oxides and mixtures thereof. Large pore aluminosilicates can include, but are not limited to, L-zeolite, Y-zeolite, mordenite, omega zeolite, beta zeolite, and the like. Amorphous inorganic oxides can include, but are not limited to, aluminum oxide, silicon oxide, and titania. Suitable bonding agents for the inorganic oxides can include, but are not limited to, silica, alumina, clays, titania, and magnesium oxide.

Zeolite materials, both natural and synthetic, are known to have catalytic properties for many hydrocarbon processes. Zeolites typically are ordered porous crystalline aluminosilicates having structure with cavities and channels interconnected by channels. The cavities and channels throughout the crystalline material generally can be of a size to allow selective separation of hydrocarbons.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms may be equal to about 2. The framework exhibits a negative electrovalence that typically is balanced by the inclusion of cations within the crystal such as metals, alkali metals, alkaline earth metals, or hydrogen.

L-type zeolite catalysts are a sub-group of zeolitic catalysts. Typical L-type zeolites contain mole ratios of oxides in accordance with the following formula:

$$M_{2/n}O \cdot Al_2O_3 \cdot xSiO_2 \cdot yH_2O \qquad (1)$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M," "x" is 2 or greater; and "y" is the number of water molecules contained in the channels or interconnected voids with the zeolite. Bound potassium (K) L-type zeolites, or KL zeolites, have been found to be particularly desirable. The term "KL zeolite" as used herein refers to L-type zeolites in which the principal metal cation (M) incorporated in the zeolite is potassium. A KL zeolite may be cation-exchanged or impregnated with another metal and one or more halides to produce a platinum (Pt)-impregnated, halided zeolite, or a KL supported, Pt-halide zeolite catalyst.

In embodiments, the at least one Group VIII metal is platinum. In another embodiment, the at least one Group VIII metal is platinum and gold. In an embodiment, the at least one Group VIII metal is platinum and rhenium. The platinum, and optionally one or more halides, may be added to the zeolite support by any suitable method, for example via impregnation with a solution of a platinum-containing compound and one or more halide-containing compounds. For example, the platinum-containing compound can be any decomposable platinum-containing compound. Examples of such compounds include, but are not limited to, ammonium tetrachloroplatinate, chloroplatinic acid, diammineplatinum (II) nitrite, bis-(ethylenediamine)platinum (II) chloride, platinum (II) acetyl acetonate, dichlorodiammine platinum, platinum (II) chloride, tetraammineplatinum (II) hydroxide, tetraammineplatinum chloride, and tetraammineplatinum (II) nitrate.

In an embodiment, the catalyst is a large pore zeolite support with a platinum-containing compound and at least one ammonium halide compound. The ammonium halide compound may comprise one or more compounds represented by the formula $N(R)_4X$, where X is a halide and where R represents a hydrogen or a substituted or unsubstituted carbon chain molecule having 1-20 carbons wherein each R may be the same or different. In an embodiment, R is selected from the group consisting of methyl, ethyl, propyl, butyl, and combinations thereof, more specifically methyl. Examples of suitable ammonium compounds are represented by the formula $N(R)_4X$ include ammonium chloride, ammonium fluoride, and tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, and combinations thereof.

The catalyst can be employed in any of the conventional types or structures known to the art. It may be employed in the form of extrudates, pills, pellets, granules, broken fragments, or various special shapes, disposed within a reaction zone (e.g., in a fixed bed), and the charging stock may be passed therethrough in the liquid, vapor, or mixed phase, and in either upward or downward, or inward or outward flow.

In embodiments, a reforming system of this disclosure further comprises a low-pressure separator configured to separate hydrogen from an effluent of at least one reactor upstream of the last reactor, thus providing hydrogen and a reduced-hydrogen effluent, whereby at least a portion of the reduced-hydrogen effluent can be introduced into a reactor downstream of the at least one reactor. In embodiments, the herein-disclosed system comprises a first reactor series comprising a plurality of reactors, wherein each of the reactors within the plurality of reactors of the first reactor series contains a catalyst capable of catalyzing the reaction of at least a portion of a hydrocarbon in a hydrocarbon feed into an aromatic hydrocarbon, thus providing a first reactor series effluent comprising the aromatic hydrocarbon, unreacted hydrocarbon, and hydrogen, a low pressure separator configured to separate hydrogen from a first reactor series effluent, thus providing hydrogen and a reduced-hydrogen first reactor series effluent, all or a portion of which is fed to a second reactor series; and wherein the second reactor series comprises a plurality of reactors, wherein at least one (and preferably all) of the reactors within the plurality of reactors of the second reactor series contains a catalyst capable of catalyzing the reaction of at least a portion of the unreacted hydrocarbon in the reduced-hydrogen first reactor series effluent into the aromatic hydrocarbon.

In certain aspects, reforming system 100 comprises a separator such as separator 135. A line 115B fluidly connects second reforming reactor 120B with intermediate effluent heat exchanger 107B, wherein heat exchange with hydrogen-reduced convertible $C_6$ hydrocarbon recycle in line 195 is affected. An intermediate effluent heat exchanger effluent outlet line 125B fluidly connects intermediate effluent heat exchanger 107B with hydrogen separator 135, whereby heat exchanged second reforming reactor effluent can be introduced thereto. Feed/effluent heat exchanger effluent outlet line 125A fluidly connects feed/effluent heat exchanger 107A with separator 135, via intermediate effluent heat exchanger effluent outlet line 125B, whereby heat exchanged sixth reforming reactor effluent can be introduced thereto. Separator 135 is any separator known in the art to be operable to separate a gas stream comprising hydrogen from a hydrogen-reduced bottoms stream. In embodiments, separator 135 is a low-pressure separator (LPS). A separated hydrogen line 137 is fluidly connected with hydrogen separator 135, for the removal of hydrogen therefrom. A compressor 138 may be operable to compress the gas, containing hydrogen, extracted from hydrogen separator 135. A portion of the compressed net gas containing hydrogen may be removed from reforming system 100 via gas outlet line 139B. A hydrogen recycle line 139A may be configured to recycle hydrogen to the reforming reactors of the reactor series (i.e., either to the first reactor series, the second reactor series, or both). For example, hydrogen recycle line 139A may split into a first series hydrogen recycle line 139C, whereby a portion of the separated hydrogen can be introduced into the first reactor series via, for example, combination with heat exchanged hydrocarbon feed line 106, and a second series hydrogen recycle line 139D, whereby another portion of the separated hydrogen can be introduced into the second reactor series via, for example, combination with hydrogen-reduced convertible $C_6$ hydrocarbon recycle line 195. Hydrogen can thus be sent back to the fresh hydrocarbon feed stream and to the second set of reactors as needed.

As noted hereinabove, a reforming system according to this disclosure may comprise one or more heat exchangers. In embodiments, a reforming system of this disclosure further comprises a heat exchange apparatus configured to transfer heat between a second hydrocarbon stream, wherein the second hydrocarbon stream comprises a greater concentration of convertible $C_6$ hydrocarbons than the hydrogen-reduced first reactor series effluent, and a first reactor series effluent prior to introduction of the second hydrocarbon stream into the second reactor series and prior to separating hydrogen from the first reactor series effluent via the hydrogen separation apparatus. For example, reforming system 100 comprises feed/effluent heat exchanger 107A and intermediate effluent heat exchanger 107B. Feed/effluent heat exchanger 107A is fluidly connected with final or 'last' (sixth reforming reactor in the embodiment of FIG. 1) reforming reactor 120F via line 115F, whereby heat exchange is facilitated between the reactor series effluent leaving reforming reactor 120F via line 115F and a hydrocarbon feed introduced into feed/effluent heat exchanger 107A via hydrocarbon feed line 105. A heat exchanged hydrocarbon feed line 106 fluidly connects feed/effluent heat exchanger 107A with first furnace 110A, whereby fresh hydrocarbon feed from fresh hydrocarbon feed line 105 can be introduced thereto. A feed/effluent heat exchanger effluent outlet line 125A is configured to introduce heat exchanged reactor series effluent into separator 135 via combination with intermediate effluent heat exchanger effluent outlet line 125B.

The herein-disclosed reforming system may further comprising apparatus configured to separate a non-convertible $C_6$ hydrocarbon from the reduced-hydrogen first reactor series effluent to produce a second hydrocarbon stream, wherein the second hydrocarbon stream comprises a greater concentration of convertible $C_6$ hydrocarbons than the reduced-hydrogen first reactor series effluent. Such apparatus may comprise a stabilizer, a $C_6/C_7$ splitter, an EDU, a DMB column, and/or a charge pump operable to introduce the second hydrocarbon stream to the second reactor series. For example, reforming system 100 comprises stabilizer 140, $C_6/C_7$ splitter 155, EDU 170, DMB column 185, and charge pump 195.

A reforming system of this disclosure may further comprise a stabilizer. In the embodiment of FIG. 1, stabilizer 140 is fluidly connected with hydrogen separator 135 via hydrogen separator bottoms outlet line 136. Stabilizer 140 is operable to separate the hydrogen separator bottoms into a light hydrocarbon stream and a stabilizer bottoms product. In embodiments, the light hydrocarbon stream comprises LPG. In embodiments, the light hydrocarbon stream comprises $C_{4-}$ hydrocarbons (i.e., hydrocarbon compounds containing four or fewer carbon atoms). In embodiments, the light hydrocarbon stream comprises $C_{4-}$ hydrocarbons (i.e., hydrocarbon compounds containing four or fewer carbon atoms). A stabilizer light hydrocarbon outlet line 145 is configured to remove a tops product comprising the light hydrocarbon from stabilizer 140. In embodiments, the stabilizer bottoms product comprises $C_{5+}$ hydrocarbons (i.e., hydrocarbon compounds containing five or more carbon atoms). A stabilizer bottoms outlet line 150 is configured for the removal of the stabilizer bottoms product from stabilizer 140.

A reforming system of this disclosure may further comprise a $C_6/C_7$ splitter. In the embodiment of FIG. 1, $C_6/C_7$ splitter 155 is fluidly connected with stabilizer 140 via stabilizer bottoms outlet line 150. $C_6/C_7$ splitter 155 is configured to separate $C_{6-}$ hydrocarbons from $C_{7+}$ hydrocarbons. A $C_{7+}$ outlet line 160 is configured for the removal of hydrocarbon compounds having seven or more carbon atoms (i.e., $C_{7+}$) from $C_6/C_7$ splitter 155. A $C_{6-}$ outlet line 165 is configured for the removal of hydrocarbon compounds having six or fewer carbon atoms (i.e., $C_{6-}$) from $C_6/C_7$ splitter 155. $C_6/C_7$ splitter 155 may be any unit known in the art to be operable to separate $C_{6-}$ hydrocarbons from $C_{7+}$ hydrocarbons.

A reforming system of this disclosure may further comprise an extractive distillation column, alternatively referred to as an extractive distillation unit (EDU). In the embodiment of FIG. 1, reforming system 100 comprises EDU 170. EDU 170 is fluidly connected with $C_6/C_7$ splitter 155 via $C_{6-}$ outlet line 165, such that the $C_{6-}$ product of the $C_6/C_7$ splitter can be introduced to EDU 170. EDU 170 is operable to separate a benzene product from the $C_{6-}$ product, and the benzene product is removed from EDU 170 via benzene product outlet line 175. A line 180 is configured to remove the remaining hydrocarbons (i.e., a benzene-reduced $C_{6-}$ product) from EDU 170. EDU 170 may be any extractive distillation unit known in the art to be operable to separate benzene from the $C_{6-}$ product introduced thereto.

A reforming system of this disclosure may further comprise a dimethylbutane (DMB) column. In the embodiment of FIG. 1, reforming system 100 comprises DMB column 185. DMB 185 is fluidly connected with EDU 170 via line 180, such that the benzene-reduced $C_{6-}$ product of EDU 170 can be introduced to DMB 185. DMB 185 is operable to separate a dimethyl butane product and a convertible $C_6$ product from the benzene-reduced $C_{6-}$ product introduced thereto. A convertible $C_6$ product outlet line 186 is configured for the removal of the convertible $C_6$ product from DMB column 185. A line 187 is configured to remove the DMB product from DMB column 185. DMB column 185 may be any unit known in the art to be operable to separate DMBs from the benzene-reduced $C_{6-}$ product introduced thereto, thus providing a DMB-reduced convertible $C_6$ product.

A reforming system of this disclosure may further comprise a charge pump. In the embodiment of FIG. 1, reforming system 100 comprises charge or 'inter-series' pump 190. Charge pump 190 is operable to pump at least a portion of a second hydrocarbon stream comprising a greater concentration of convertible $C_6$ hydrocarbons than the reduced-hydrogen first reactor series effluent for introduction into the second series of reforming reactors. In the embodiment of FIG. 1, charge pump 190 pumps the convertible $C_6$ product from DMB column 185 to third furnace 110C via passage through intermediate effluent heat exchanger 107B.

As described herein, embodiments of a reforming system of this disclosure comprise a reactor series comprising a plurality of reactors, including a first reactor, a last reactor, and at least one intermediate reactor, wherein each reactor within the plurality of reactors contains a catalyst capable of catalyzing the reaction of at least a portion of a hydrocarbon in a hydrocarbon feed into an aromatic hydrocarbon, thus providing a reactor series effluent comprising the aromatic hydrocarbon, unreacted hydrocarbon, and hydrogen; and piping configured such that a bypass portion of the hydrocarbon feed can bypass the first reactor of the reactor series and be introduced into at least one reactor downstream of the first reactor, whereby the bypass portion of the hydrocarbon feed bypasses the first reactor, and wherein a remainder portion of the hydrocarbon feed is introduced into the first reactor. Thus, in embodiments, a system of this disclosure comprises piping whereby the hydrocarbon feed injection to the reforming reactors can be staggered, with not all of the hydrocarbon feed being introduced initially into the first reforming reactor of the system. Such a system will now be described with reference to FIG. 2, which is a schematic of a reforming system 200 according to an embodiment of this disclosure. In some aspects, a system such as system 200 comprises six reforming reactors, 220A, 220B, 220C, 220D, 220E, and 220F, in series, and piping 208, 208A, 208B, 208C, 208D, 208E configured to stagger a hydrocarbon feed, such that a portion thereof bypasses at least the first reforming reactor, while a remainder of the hydrocarbon feed is introduced into the first reforming reactor. As noted hereinabove, although shown with six reforming reactors in the embodiment of FIG. 2, it is to be understood that a reforming system according to this disclosure can comprise more or fewer than six reforming reactors. For example, in embodiments, a reforming system according to this disclosure comprises seven, eight, or more reforming reactors. In other embodiments, a reforming system according to this disclosure can comprise five, four, or three reforming reactors.

As with reforming system 100 described hereinabove with reference to FIG. 1, a reforming system of this disclosure can further comprise one or more furnaces, separators, sulfur removal apparatus, stabilizers, $C_6/C_7$ splitters, extractive distillation units (EDUs), dimethyl butane (DMB) columns, pumps, compressors, and/or heat exchangers. Reforming system 200 comprises furnaces 210A, 210B, 210C, 210D, 210E, and 210F, sulfur removal apparatus 209, hydrogen separator 235, stabilizer 240, $C_6/C_7$ splitter 255, EDU 270, first feed/effluent heat exchanger 207A, second feed/effluent heat exchanger 207B, and compressor 238.

In the figures, like numerals are utilized to represent like components. Reforming reactors 220A, 220B, 220C, 220D, 220E, and 220F, and associated furnaces 210A, 210B, 210C, 210D, 210E, and 210F, hydrogen separator 235, stabilizer 240, $C_6/C_7$ splitter 255, EDU 270, and first feed/effluent heat exchanger 207A correspond with reforming reactors 120A, 120B, 120C, 120D, 120E, and 120F, and associated furnaces 110A, 110B, 110C, 110D, 110E, and 110F, hydrogen separator 135, stabilizer 140, $C_6/C_7$ splitter 155, EDU 170, and feed/effluent heat exchanger 107A, described hereinabove with reference to the embodiment of FIG. 1.

Reforming system 200 comprises a series of six reforming reactors, with hydrogen separation subsequent the final reforming reactor, sixth reforming reactor 220F. In reforming system 200, first furnace 210A is fluidly connected with first reforming reactor 220A via line 212A, first reforming reactor 220A is fluidly connected with second furnace 210B via line 215A, second furnace 210B is fluidly connected with second reforming reactor 220B via line 212B, second reactor 220B is fluidly connected with third furnace 210C via line 215B, third furnace 210C is fluidly connected with third reforming reactor 220C via line 212C, third reforming reactor 220C is fluidly connected with fourth furnace 210D via line 215C, fourth furnace 210D is fluidly connected with fourth reforming reactor 220D via line 212D, fourth reforming reactor 220D is fluidly connected with fifth furnace 210E via line 215D, fifth furnace 210E is fluidly connected with fifth reforming reactor 220E via line 212E, fifth reforming reactor 220E is fluidly connected with sixth furnace 210F via line 215E, sixth furnace 210F is fluidly connected with sixth reforming reactor 220F via line 212F, sixth reforming reactor 220F is fluidly connected with second feed/effluent heat exchanger 207B via line 215F.

In embodiments, reforming reactors 220A, 220B, 220C, 220D, 220E, and 220F each contain a catalyst for performing a reforming process, which catalyst may be as described as hereinabove with reference to the embodiment of FIG. 1.

Reforming system 200 also comprises piping configured such that a bypass portion of the hydrocarbon feed can bypass at least the first reforming reactor of the reactor series and be introduced into at least one reactor downstream of the first reforming reactor. The feed can be diverted at any point upstream of the first furnace or reforming reactor. The feed can be diverted upstream or downstream of sulfur removal apparatus 209, further described hereinbelow. In embodiments, reforming system 200 comprises piping 208 fluidly connected with heat exchanged hydrocarbon feed line 206A upstream of hydrogen recycle line 239A and sulfur removal apparatus 209, and configured such that a bypass portion of the hydrocarbon feed can bypass at least the first reforming reactor of the reactor series and be introduced into at least one reactor downstream of the first reforming reactor.

In embodiments, portions of the hydrocarbon feed are introduced directly upstream of at least one furnace associated with a reforming reactor downstream of the first reforming reactor. For example, a portion of the hydrocarbon feed in heat exchanged hydrocarbon feed line 206A may be diverted via piping 208 and 208A into line 215A, whereby the diverted portion of the hydrocarbon feed can be introduced into second furnace 210B associated with second reforming reactor 220B; a portion of the hydrocarbon feed in heat exchanged hydrocarbon feed line 206A may be diverted via piping 208 and 208B into line 215B, whereby the diverted portion of the hydrocarbon feed can be introduced into third furnace 210C associated with third reforming reactor 220C; a portion of the hydrocarbon feed in heat exchanged hydrocarbon feed line 206A may be diverted via piping 208 and 208C into line 215C, whereby the diverted portion of the hydrocarbon feed can be introduced into fourth furnace 210D associated with fourth reforming reactor 220D; a portion of the hydrocarbon feed in heat exchanged hydrocarbon feed line 206A may be diverted via piping 208 and 208D into line 215D, whereby the diverted portion of the hydrocarbon feed can be introduced into fifth furnace 210E associated with fifth reforming reactor 220E; a portion of the hydrocarbon feed in heat exchanged hydrocarbon feed line 206A may be diverted via piping 208 and 208E into line 215E, whereby the diverted portion of the hydrocarbon feed can be introduced into sixth furnace 210F associated with sixth reforming reactor 220F; or any combination of the foregoing.

In embodiments, system 200 piping 208', fluidly connected with heat exchanged hydrocarbon feed line 206A downstream of hydrogen recycle line 239A, configured to provide some or the entire bypass portion of the hydrocarbon feed that bypasses at least the first reforming reactor of the reactor series and be introduced into at least one reactor downstream of the first reforming reactor. In embodiments, system 200 piping 208", fluidly connected with sulfur reduced feed line 205B, configured to provide some or the entire bypass portion of the hydrocarbon feed that bypasses at least the first reforming reactor of the reactor series and be introduced into at least one reactor downstream of the first reforming reactor. In embodiments, system 200 piping 208''', fluidly connected with twice heat exchanged hydrocarbon feed line 206B, configured to provide some or the entire bypass portion of the hydrocarbon feed that bypasses at least the first reforming reactor of the reactor series and be introduced into at least one reactor downstream of the first reforming reactor.

In embodiments, a reforming system of this disclosure comprises sulfur removal apparatus. Reforming system 200 comprises sulfur removal apparatus 209. Sulfur removal apparatus 209 is operable to remove sulfur compounds from a hydrocarbon feed introduced thereto via hydrocarbon feed line 206A. In embodiments, piping 208 is configured to divert the bypass portion of the hydrocarbon feed upstream of sulfur removal apparatus 209 configured to remove sulfur compounds from the remainder portion of the hydrocarbon feed introduced into the first reforming reactor.

A sulfur-reduced feed line 205B may fluidly connect sulfur removal apparatus 209 with second feed/effluent heat exchanger 207B. Sulfur removal apparatus 209 may be any apparatus known to those of skill in the art to be operable to reduce the amount of sulfur compounds in a hydrocarbon feed. Such sulfur compounds may be poisons to a reforming catalyst, and thus sulfur-reducing apparatus 209 may reduce the level of such sulfur-containing compounds upstream of the reforming catalyst in reforming reactors 220. In embodiments, sulfur removal apparatus 209 comprises a sulfur converter/adsorber or SCA. In embodiments, sulfur removal system 209 comprises one or more vessels that allow the hydrocarbon stream to pass as a fluid through a sulfur removal system comprising a sulfur converter, containing a group VIII metal, and a sulfur adsorber. Sulfur removal system 209 may also function as a precaution or backup in case any upstream hydrotreating system fails or experiences an operating upset.

Second feed/effluent heat exchanger 207B is fluidly connected with final or 'last' (i.e., the sixth reforming reactor in the embodiment of FIG. 2) reforming reactor 220F via line 215F, such that heat exchange is facilitated between the reactor series effluent leaving reforming reactor 220F via line 215F and a reduced-sulfur hydrocarbon feed introduced into second feed/effluent heat exchanger 207B via feed line 205B. A twice heat exchanged feed line 206B fluidly connects second feed/effluent heat exchanger 207B with first furnace 210A, whereby fresh hydrocarbon feed from fresh hydrocarbon feed line 205A can be introduced thereto. A second feed/effluent heat exchanger effluent outlet line 225 is configured to introduce heat exchanged reactor series effluent into first feed/effluent heat exchanger 207A. Fresh hydrocarbon feed line 205A is fluidly connected with first feed/effluent heat exchanger 207A, whereby fresh hydrocarbon feed can be introduced thereto, and heat can be exchanged between the fresh hydrocarbon feed and the heat exchanged reactor series effluent introduced thereto via second feed/effluent heat exchanger outlet line 225. A line 230 is configured for the removal of twice heat exchanged reactor series effluent from first feed/effluent heat exchanger 207A.

In some aspects, a reforming system in accordance with the instant disclosure, such as reforming system 200, comprises hydrogen separator 235. Line 230 is configured for the removal of twice heat exchanged reactor effluent from first feed/effluent heat exchanger 207A, and introduction thereof into hydrogen separator 235. A separated hydrogen line 237 is fluidly connected with hydrogen separator 235, for the removal of hydrogen therefrom, and a hydrogen separator bottoms outlet line 236 is fluidly connected with hydrogen separator 235 for the removal therefrom of a reduced-hydrogen reforming reactor product.

A compressor 238 may be operable to compress the gas, containing hydrogen, extracted from hydrogen separator 235. A portion of the compressed net gas containing hydrogen may be removed from reforming system 200 via gas outlet line 239B. The hydrogen product in line 239B may be further purified to provide hydrogen for use in an industrial process (e.g., a refinery). A hydrogen recycle line 239A may be configured to recycle hydrogen to the reforming reactors of the reactor series. For example, hydrogen recycle line 239A may be configured such that a portion of the separated hydrogen can be introduced into the first reactor of the series via, for example, combination with heat exchanged hydrocarbon feed line 206A. The introduction of hydrogen into hydrocarbon feed line 206A may be downstream of the location(s) at which hydrocarbon feed is diverted via piping 208. That is, line 208 may be connected with hydrocarbon feed line 206A upstream of the location at which hydrogen is combined therewith via hydrogen recycle line 239A. In this manner, the diverted hydrocarbon feed will comprise less hydrogen (i.e., no added hydrogen), thus enabling a reduction in the molar ratio of hydrogen to hydrocarbon in one or more of the reforming reactors downstream of the first reforming reactor, relative to a conventional reforming system in which the entirety of the hydrocarbon feed passes through the first reforming reactor of the system.

In embodiments, compressor 238 is configured to compress the separated hydrogen and provide compressed hydrogen such that combination of the compressed hydrogen introduced into the remainder portion of the hydrocarbon feed in line 206A downstream of piping 208 provides a molar ratio of hydrogen to hydrocarbon in a feed to first reforming reactor 220A that is in the range of from about 1.5:1 to about 2.0:1.

In embodiments, the method further comprises adjusting the amount of compressed hydrogen combined via hydrogen recycle line 239A with the remainder portion of the hydrocarbon feed in hydrocarbon feed line 206A downstream of where piping 208 diverts a portion of the hydrocarbon feed, such that the combination provides a hydrocarbon feed to first reforming reactor 220A that has a molar ratio of hydrogen to hydrocarbon that is in the range of from about 1.5:1 to about 2.0:1.

As noted herein with reference to the embodiment of FIG. 1, the disclosed reforming system may further comprise apparatus configured to separate one or more components from the reduced-hydrogen reformer product removed from hydrogen separator 235 via hydrogen separator bottoms outlet line 236. The apparatus configured to separate one or more components from the reduced-hydrogen reformer product may comprise one or more of a stabilizer, a $C_6/C_7$ splitter, an EDU, and/or a DMB column. For example, reforming system 200 comprises stabilizer 240, $C_6/C_7$ splitter 255, and EDU 270, which may be units as described hereinabove with reference to stabilizer 140, $C_6/C_7$ splitter 155, and EDU 170 of the embodiment of FIG. 1.

Stabilizer 240 is fluidly connected with hydrogen separator 235 via hydrogen separator bottoms outlet line 236. Stabilizer 240 is operable to separate the hydrogen separator bottoms into a light hydrocarbon stream and a stabilizer bottoms product, as described hereinabove with reference to FIG. 1. A stabilizer light hydrocarbon outlet line 245 is configured to remove a tops product comprising the light hydrocarbon from stabilizer 240. A stabilizer bottoms outlet line 250 is configured for the removal of the stabilizer bottoms product from stabilizer 240. $C_6/C_7$ splitter 255 is fluidly connected with stabilizer 240 via stabilizer bottoms outlet line 250. $C_6/C_7$ splitter 255 is configured to separate $C_{6-}$ hydrocarbons from $C_{7+}$ hydrocarbons. A $C_{7+}$ outlet line 260 is configured for the removal of hydrocarbon compounds having seven or more carbon atoms (i.e., $C_{7+}$) from $C_6/C_7$ splitter 255. A $C_{6-}$ outlet line 265 is configured for the removal of hydrocarbon compounds having six or fewer carbon atoms (i.e., $C_{6-}$) from $C_6/C_7$ splitter 255. EDU 270 is fluidly connected with $C_6/C_7$ splitter 255 via $C_{6-}$ outlet line 265, such that the $C_{6-}$ product of the $C_6/C_7$ splitter can be introduced to EDU 270. EDU 270 is operable to separate a benzene product from the $C_{6-}$ product, and the benzene product is removed from EDU 270 via benzene product outlet line 275. A line 280 is configured to remove the remaining hydrocarbons (i.e., a benzene-reduced $C_{6-}$ product) from EDU 270, and may introduce same into a DMB column such as that depicted in the embodiment of FIG. 1, or may direct same to final use, such as to a mogas pool.

In embodiments, hydrocarbon feed introduced via hydrocarbon feed line 205A/206A is a substantially sulfur-free feed. In embodiments, all the fresh feed in hydrocarbon feed line 205A/206A is introduced into sulfur-removal apparatus or SCA 209. As sulfur removal generally incorporates hydrogen into the feed, in such embodiments, a substantially hydrogen-free hydrocarbon feed for introduction into downstream reactor(s) via piping 208 may be obtained by recycling unreacted convertible feed obtained from downstream separations, for example convertible $C_6$ hydrocarbons obtained from a DMB column such as described with reference to FIG. 1. This feed would have already passed through the SCA 209, and would thus be substantially sulfur-free. Alternatively, the SCF bed (i.e., the sulfur converter) of a sulfur converter/adsorber 209 could be positioned immediately subsequent a naphtha hydrotreater (not shown in the embodiment of FIG. 2) positioned to pretreat the hydrocarbon feed upstream of reforming system 100/200. In such embodiments, the SCG bed (i.e., the sulfur adsorber) of SCA 209 could be moved to pick up sulfur after the desulfurizer and sulfur sorber. In such embodiments, any hydrogen for use in the SCA could be removed in the overheads of the desulfurizer column.

It is to be understood that the embodiments of FIGS. 1 and 2 can be combined. That is, a reforming system of this disclosure may comprise both mid-series hydrogen separation (i.e., hydrogen separation upstream of (at least) the final reforming reactor), and piping whereby at least a portion of the hydrocarbon feed can be introduced to a reforming reactor downstream of the first reforming reactor.

Also disclosed herein is a method for the catalytic reforming of hydrocarbons. The method comprises operating a series of reactors, wherein the series of reactors comprises a plurality of reactors, including a first reactor and a last reactor, and wherein each reactor within the plurality of reactors in the series of reactors contains a catalyst capable of catalyzing the reaction of at least a portion of hydrocarbons in a hydrocarbon feed into aromatic hydrocarbons, thus providing a reactor effluent comprising the aromatic hydrocarbons, unreacted hydrocarbons, and hydrogen; and adjusting the partial pressure of hydrogen within the series of reactors by: (a) separating hydrogen from an effluent of at least one reactor upstream of the last reactor, thus providing hydrogen and a reduced-hydrogen effluent, and introducing at least a portion of the reduced-hydrogen effluent into a reactor downstream of the at least one reactor; (b) directing a portion of the hydrocarbon feed to form a supplemental feed and introducing the supplemental feed into at least one reactor downstream of the first reactor in the reactor series, thus bypassing the first reactor with the portion of the hydrocarbon feed, and introducing a remainder portion of the hydrocarbon feed into the first reactor of the reactor series; or both (a) and (b).

As discussed herein, conventional reforming takes a sulfur free $C_6/C_7$ feed and runs it through a series of 6-7 reactors. This product then passes through a feed effluent heat exchanger before proceeding to downstream separations. During the reforming process, highly branched compounds, such as dimethylbutanes (DMBs), are cracked. Larger hydrocarbons are also quickly aromatized and then cracked.

Operation of reforming catalyst with a lower hydrogen partial pressure may be desirable in order to decrease hydrocracking of the feed to fuel gas. However, hydrogen, a product of the aromatization reaction, increases in partial pressure as feed passes through the reactor train/series and is converted. According to embodiments of this disclosure, some of this undesirable hydrogen is removed in the middle of the reaction in order to maintain a more consistent hydrogen partial pressure within the reforming reactors, and enhance selectivity. In embodiments, branched non-convertible hydrocarbons and/or substituted aromatics (generally, $C_{7+}$ aromatics) can also be removed before undergoing substantial cracking.

In embodiments, a reforming method of this disclosure thus comprises separating hydrogen from an effluent of at least one reactor upstream of the last reactor, to provide hydrogen and a reduced-hydrogen effluent, and introducing at least a portion of the reduced-hydrogen effluent into a reactor downstream of the at least one reactor. In embodiments, a method of this disclosure comprises operating a first series of reactors, wherein the first series of reactors comprises a plurality of reactors, and wherein each reactor within the plurality of reactors in the first series of reactors contains a catalyst capable of catalyzing the reaction of at least a portion of hydrocarbons in a hydrocarbon feed into aromatic hydrocarbons, thus providing a first reactor series effluent comprising the aromatic hydrocarbons, unreacted hydrocarbons, and hydrogen; separating hydrogen from the first reactor series effluent, thus providing hydrogen and a reduced-hydrogen first reactor series effluent; and operating a second series of reactors, wherein the second series of reactors comprises a plurality of reactors, and wherein each reactor within the plurality of reactors in the second series of reactors contains a catalyst capable of catalyzing the reaction of at least a portion of the unreacted hydrocarbons in the reduced-hydrogen first reactor series effluent into the aromatic hydrocarbons.

A description of a method of reforming according to this disclosure, which may provide enhanced selectivity via inter-series hydrogen removal, will now be made with reference to FIG. 1. A hydrocarbon feed comprising one or more convertible hydrocarbons to be reformed to produce aromatic hydrocarbon(s) is introduced into reforming system 100 via hydrocarbon feed line 105. Various feedstocks may be suitable for use with reforming processes and generally comprise non-aromatic hydrocarbons. For example, the hydrocarbon feed may include naphtha boiling range hydrocarbons comprising a majority of $C_6$-$C_7$ paraffins. In embodiments, the hydrocarbon feed comprises primarily $C_6$ and higher non-aromatic organic compounds. Such a feed may include n-hexane and/or n-heptane. In embodiments, the hydrocarbon feed introduced via hydrocarbon feed inlet line 105 is a mixture of hydrocarbons comprising $C_6$ to $C_8$ hydrocarbons. In embodiments, the hydrocarbon feed comprises up to about 10 wt. %, or up to about 15 wt. % of $C_5$ and lighter hydrocarbons ($C_5^-$). In embodiments, the hydrocarbon feed comprises up to about 10 wt. % of $C_9$ and heavier hydrocarbons ($C_9^+$). In embodiments, the utilization of inter-stage heavy component separation as described herein with reference to the embodiment of FIG. 1, enables utilization of a heavier hydrocarbon feed. For example, in embodiments, the hydrocarbon feed comprises more than about 10, 15, 20, or 25 weight percent (wt. %) of hydrocarbons containing eight or more carbon atoms (CO. In such embodiments, an upstream apparatus conventionally utilized for the removal of heavy hydrocarbons can be absent from the system. For example, in embodiments, utilization of inter-series heavy component removal obviates the presence of a conventional upstream dehexanizer.

In embodiments, the hydrocarbon feed boils at a temperature within the range of from about 70° F. (about 21° C.) to about 450° F. (about 232° C.), or in the range of from about 120° F. (49° C.) to about 400° F. (204° C.). In embodiments, the hydrocarbon feed in hydrocarbon feed line 105 is a substantially sulfur free feed. In embodiments, the hydrocarbon feed stream has a sulfur content of from less than or equal to about 200 parts per billion by weight (ppbw), 100 ppbw, or 10 ppbw, or in the range of from about 10 ppbw to about 100 ppbw. Examples of suitable feedstocks include straight-run naphthas from petroleum refining or fractions thereof which have been hydrotreated to remove sulfur and other catalyst poisons. Also suitable are synthetic naphthas or naphtha fractions derived from other sources such as coal, natural gas, or from processes such as Fischer-Tropsch processes, fluid catalytic crackers, and hydrocrackers.

While not shown in FIG. 1 or 2, various upstream hydrocarbon pretreatment steps may be used to prepare the hydrocarbon for the reforming process. For example, hydrotreating may be used to remove catalyst poisons such as sulfur. Contacting the hydrocarbon with a sufficient amount or concentration of nickel (Ni) catalyst, for example, prior to the reforming reaction may also protect against failure of the hydrotreating system. In embodiments, such as discussed hereinbelow with reference to FIG. 2, the reforming system may further comprise another feed/effluent heat exchanger upstream of a sulfur converter adsorber which itself is located upstream of feed/effluent heat exchanger 107A of FIG. 1.

Hydrocarbon feed is introduced into feed/effluent heat exchanger 107A via hydrocarbon feed inlet line 105. Within feed/effluent heat exchanger 107A, heat is transferred between the sixth reforming reactor effluent introduced into feed/effluent heat exchanger 107A via line 115F. Heat exchanged hydrocarbon feed is removed from feed/effluent heat exchanger 107A via heat exchanged hydrocarbon feed line 106, and introduced into first furnace 110A. Hydrogen separated in inter-series hydrogen separator 135 may be introduced via first reforming reactor series hydrogen recycle line 139C with the heat exchanged hydrocarbon feed via introduction into heat exchanged hydrocarbon feed line 106. First furnace 110A raises the temperature of the hydrocarbon feed prior to introduction of the elevated temperature feed into first reforming reactor 120A via first furnace outlet line 112A. Reforming of the hydrocarbon feed takes place in first reforming reactor 120A, the first reforming reactor effluent is removed from first reforming reactor 120A via first reforming reactor outlet line 115A, and is introduced into second furnace 110B, wherein the temperature of the effluent is raised prior to introduction thereof into second reforming reactor 120B via second furnace outlet line 112B. In the embodiment of FIG. 1, the first reactor series comprises first and second reforming reactors 120A and 120B, respectively. The first reactor series effluent is removed from second reforming reactor 120B via second reforming reactor effluent line 115B.

The first reactor series effluent is introduced via second reforming reactor effluent line 115B into intermediate effluent heat exchanger 107B, wherein heat exchange with hydrogen-reduced convertible $C_6$ hydrocarbon in recycle line 195 reduces the temperature of the second reforming reactor effluent and increases the temperature of the hydrogen-reduced convertible $C_6$ hydrocarbon stream (also referred to herein as the 'second hydrocarbon stream'). A cooled first reactor series effluent is removed from intermediate effluent heat exchanger 107B via intermediate effluent heat exchanger first reactor series outlet line 125B. Heat exchanged second reactor series effluent may be combined via feed/effluent heat exchanger effluent outlet line 125A with intermediate effluent heat exchanger first reactor series outlet line 125B, prior to introduction into hydrogen separator 135.

Hydrogen separator 135 is operated to separate hydrogen from the first reactor series effluent. Although indicated as positioned after the second reforming reactor in the embodiment of FIG. 1, hydrogen separator 135 may be positioned at any 'inter-reactor' position within the reforming system, such that separator 135 is positioned to remove hydrogen from a reactor effluent other than (or in addition to) the last reforming reactor effluent. For example, hydrogen separator 135 can be positioned to separate hydrogen from the first reforming reactor effluent, from the second reforming reactor effluent (as indicated in the embodiment of FIG. 1), from the third reforming reactor effluent, from the fourth reforming reactor effluent, and/or from the fifth reforming reactor effluent; hydrogen separator 135 may also operate to separate hydrogen from the last reforming reactor effluent (e.g., from the sixth reforming reactor effluent in accordance with FIG. 1).

Hydrogen separator 135 is operated to separate, from the associated feedstream, hydrogen with the net gas removed from the system, thus providing a hydrogen-reduced product, which is removed from hydrogen separator 135 via hydrogen separator bottoms outlet line 136. The hydrogen-reduced product in hydrogen separator bottoms outlet line 136 may be a liquid product comprising from about 60 wt. % to about 90 wt. %, from about 65 wt. % to about 90 wt. %, or from about 70 wt. % to about 90 wt. % aromatics. Hydrogen separated within hydrogen separator 135 is removed from hydrogen separator 135 via separated hydrogen outlet line 137. The separated hydrogen may be compressed within compressor 139. Compressed gas leaving compressor 138 via compressor outlet line 139 may be utilized as desired throughout the reforming system. Hydrogen is thus removed at LPS 135 with the net gas removed from the system. Some hydrogen can also be sent back to the be combined with the fresh hydrocarbon feed stream and to the second set of reactors. For example, in embodiments, a portion of the net gas is removed from the reforming/aromatization system via net gas outlet line 139B. A hydrogen recycle line 139A may be utilized to recycle separated, compressed hydrogen to the reforming reactors. For example, in the embodiment of FIG. 1, hydrogen recycle line 139A is divided into two portions, with a first hydrogen recycle portion being introduced into first reforming reactor series S1 via first series hydrogen recycle line 139C, and a second hydrogen recycle portion being introduced into second reforming reactor series S2 via second series hydrogen recycle line 139D.

In embodiments, the reforming reaction occurs under process conditions that thermodynamically favor the dehydrocyclization reactions and limit undesirable hydrocracking reactions. The reforming reaction can be performed using any conventional reforming conditions, which may, in embodiments, be adjusted as described hereinbelow. Thus, reforming may be carried out at reactor inlet temperatures ranging from about 600° F. (about 316° C.) to about 1100° F. (about 593° C.), from about 650° F. (about 343° C.) to about 1100° F. (about 593° C.), from about 700° F. (about 371° C.) to about 1100° F. (about 593° C.), from about 800° F. (about 427° C.) to about 1050° F. (566° C.), or from about 850° F. (454° C.) to about 1050° F. (566° C.). Reforming reaction pressures may range from about atmospheric pressure to about 500 psig (3.4 MPa), from about 25 psig (about 0.2 MPa) to about 300 psig (about 2.1 MPa), or from about 30 psig (about 0.2 MPa) to about 100 psig (about 0.7 MPa). The molar ratio of hydrogen to hydrocarbon in the reactor stream may be between about 0.1:1 and about 10:1, alternatively from about 0.5:1 to about 5.0:1, and alternatively from about 1:1 to about 3:1. The liquid hourly space velocity (LHSV) for the hydrocarbon feed over the aromatization catalyst may be from about to about 20, from about 0.50 to about 5.0, or from about 0.50 to about 3.0, based on the catalyst in the reaction zone.

In embodiments, the first series of reactors is operated at a lower severity than the second series of reforming reactors. For example, the temperatures used in the first series of reforming reactors (i.e., in the reforming reactors upstream of hydrogen separator 135 and intermediate effluent heat exchanger 107B) may be maintained below about 800° F., about 750° F., or about 700° F., while the second series of reactors (i.e., in the reforming reactors downstream of hydrogen separator 135 and intermediate effluent heat exchanger 107B) may be operated above about 800° F., about 750° F., or about 700° F. For example, in embodiments, at least one, a plurality, or all of the reactors within the plurality of reactors in the first series of reactors is operated at a lower severity than at least one, a plurality, or all of the reactors within the plurality of reactors in the second series of reactors. The lower severity may comprise an average catalyst bed temperature, or a reactor endotherm over the course of a run that is at least 30° C., or 40° C. less. In embodiments, a fouling rate of the catalyst in any single reactor, two or more reactors, or all of the reactors within the plurality of reactors in the first series of reactors is less than a fouling rate of the catalyst in any one reactor, two or more reactors, or all of the reactors within the plurality of reactors in the second series of reactors.

In embodiments, the reforming reactors of the first series of reactors (i.e., in the reforming reactors upstream of hydrogen separator 135 and intermediate effluent heat exchanger 107B) are operated at a significantly lower temperature than the next series/set of reactors, but still at a temperature that is high enough that longer chain hydrocarbons, cyclohexane, and additional longer chain hydrocarbons are converted to aromatics. Without limitation, the lower temperature operation of the reforming reactors of first reactor series S1 may help prevent or minimize cracking of the generated alkylbenzenes and other branched molecules in the feed.

In embodiments, the operating conditions of the second series of reforming reactors is more severe. This may include increased temperature and/or pressure in the second reactor series, and/or different process stream flowrates and/or reactant ratio therein. In embodiments, the weight hourly space velocity is at least about 50%, about 75%, or about 100% greater in the second series of reactors relative to the first series of reactors. In an embodiment, the ratio of hydrogen to hydrocarbon within at least one reactor of the second series of reforming reactors is at least about 10%, about 25%, or about 50% less than a ratio of hydrogen to hydrocarbon within at least one reactor of the first series of reforming reactors.

The selectivity for converting the convertible hydrocarbon components to aromatics is a measure of the effectiveness of the aromatization reaction in converting convertible hydrocarbon components to the desired and valuable products: aromatics and hydrogen, as opposed to the less desirable by-products, such as products from hydrocracking in the aromatization reactor system(s) 100/200. The dehydrocyclization catalyst may be used under reaction conditions effective to achieve per pass conversion of convertible components to aromatics and other hydrocarbons of at least about 50 wt. %, about 60 wt. %, or about 70 wt. %. The yield of desired aromatics product, on a per pass basis, is the per pass conversion times the selectivity. The term "selectivity" as used herein is defined as a percentage of moles of convertible hydrocarbon components converted to aromatics compared to moles converted to aromatics and other products (for example, cracked products). Thus, percent selectivity for convertible components may be defined by the following formula: selectivity=(100×moles of convertible components converted to aromatics)/(moles of selectively convertible components converted to aromatics and other products). Isomerization of paraffins and interconversion paraffins and alkylcyclopentanes having the same number of carbon atoms per molecule are not considered in determining selectivity.

The reforming method may further comprise separating a second hydrocarbon stream comprising a greater concentration of convertible $C_6$ hydrocarbons than the reduced-hydrogen reforming reactor effluent from the reduced-hydrogen reforming reactor effluent. In embodiments, the reduced-hydrogen first reactor series effluent comprises a non-convertible $C_6$ hydrocarbon, and the method further comprises separating the non-convertible $C_6$ hydrocarbon from the reduced-hydrogen first reactor series effluent to produce a second hydrocarbon stream, and introducing the second hydrocarbon stream to the second series of reactors, wherein the second hydrocarbon stream comprises a greater concentration of convertible $C_6$ hydrocarbons than the reduced-hydrogen first reactor series effluent. Such methods may further comprise separating light hydrocarbons (e.g., $C_{4-}$, or LPG), $C_{7+}$, benzene, and/or DMBs from the reduced-hydrogen reformer product removed from hydrogen separator 135 via hydrogen separator bottoms outlet line 136.

In embodiments, the herein-disclosed method further comprises separating light hydrocarbons from the reduced-hydrogen reformer product removed from hydrogen separator 135. For example, in embodiments, the bottoms of LPS 135 comprising reduced-hydrogen reforming product is introduced to stabilizer 140 via hydrogen separator bottoms outlet line 136. Stabilizer 140 operates to remove $C_{4-}$, thus providing a $C_{5+}$ product. A $C_{4-}$ stream is removed from stabilizer 140 via stabilizer light hydrocarbon outlet line 145, and $C_{5+}$ hydrocarbons are removed from stabilizer 140 via stabilizer bottoms outlet line 150. The light hydrocarbon stream may comprise LPG.

In embodiments, the herein-disclosed method further comprises separating $C_{7+}$ hydrocarbons from the reduced-hydrogen reformer product removed from hydrogen separator 135. For example, in embodiments, the bottoms from stabilizer 140 is introduced into $C_6/C_7$ splitter 155, which separates a $C_{7+}$ hydrocarbon product stream, which is removed from $C_6/C_7$ splitter 155 via $C_{7+}$ outlet line 160, from a $C_{6-}$ hydrocarbon product stream, which is removed from $C_6/C_7$ splitter 155 via $C_{6-}$ outlet line 165. The $C_{7+}$ species in the $C_{7+}$ product may be removed from the reforming system, for example to mogas (motor gasoline pool) via $C_{7+}$ outlet line 160. The $C_{6-}$ hydrocarbons in the overhead product from $C_6/C_7$ column 155 may be introduced into EDU 170 via $C_{6-}$ outlet line 165.

In embodiments, the herein-disclosed method further comprises separating benzene from the reduced-hydrogen reformer product removed from hydrogen separator 135. For example, in embodiments, extractive distillation unit 170 is operated to separate benzene from the remaining hydrocarbons. The benzene product is removed from EDU 170 via benzene product outlet line 175. The remaining benzene-reduced hydrocarbons can be removed from EDU 170 via benzene-reduced hydrocarbon outlet line 180.

In embodiments, the herein-disclosed method further comprises separating dimethylbutanes from the hydrogen-reduced reformer product removed from hydrogen separator 135. For example, in embodiments, benzene-reduced hydrocarbon product in benzene-reduced hydrocarbon outlet line 180 is introduced into DMB column 185. DMB 185 is operated to separate DMBs, which are removed from DMB column 185 via DMB outlet line 187. The separated DMBs may be removed from reforming system 100, for example, being sent to mogas. The bottoms of DMB column 185, which may consist almost exclusively of convertible $C_6$ species, can be removed from DMB column 185 via convertible $C_6$ product outlet line 186. In embodiments, convertible $C_6$ product in convertible $C_6$ product outlet line 186 comprises at least about 60 wt. %, about 70 wt. %, about 80 wt. %, or about 90 wt. % convertible $C_6$ hydrocarbons.

The second hydrocarbon stream comprising a greater concentration of convertible $C_6$ hydrocarbons than the reduced-hydrogen reforming reactor effluent can be introduced into the second series of reforming reactors. For example, in the embodiment of FIG. 1, convertible $C_6$ product in convertible $C_6$ product outlet line 186 is pumped via charge or 'inter-stage' pump 190 and hydrogen reduced, convertible $C_6$ hydrocarbon recycle line 195 to second reactor series S2. Prior to introduction into the first reforming reactor of the second series S2 of reforming reactors (i.e., third reforming reactor 120C in the embodiment of FIG. 1), the hydrogen reduced, convertible $C_6$ hydrocarbon in recycle line 195 can be subjected to heat exchange in intermediate effluent heat exchanger 107B with the first reforming reactor series effluent introduced thereto via second reforming reactor effluent outlet line 115B, and heated via passage through third furnace 110C. In certain embodiments, the second hydrocarbon stream introduced into the second reforming reactor series comprises $C_{5+}$ hydrocarbons removed from stabilizer 140 via stabilizer bottoms outlet line 150, $C_{7+}$-reduced hydrocarbons removed from $C_6/C_7$ splitter 155 via $C_{6-}$ outlet line 165, benzene-reduced $C_{6-}$ product removed from EDU 170 via benzene-reduced $C_{6-}$ product outlet line 180, DMB-reduced hydrocarbons removed from DMB column 185 via convertible $C_6$ product outlet line 186, or a combination thereof. That is, in embodiments, one or more recycle lines 195 fluidly connects stabilizer 140, $C_6/C_7$ splitter 155, EDU 170, DMB column 185, or a combination thereof, with second reforming reactor series S2.

In embodiments, the second set or series (S2) of reforming reactors is run at harsher conditions than the first series of reforming reactors, which may enhance the conversion of $C_6$ compounds into benzene. The hydrogen partial pressure of these reactors can be better controlled by the disclosed system and method, due to the intermediate removal of hydrogen during the inter-series separations at the hydrogen separator 135 described herein. Since the branched species (such as DMBs) and heavier compounds ($C_{8+}$) are removed (e.g., via DMB column 185 and $C_6/C_7$ splitter 155) prior to the second reforming reactor series, significantly less cracking to light molecules may occur even at the more severe conditions therein. The reforming effluent from the second set of reforming reactors (i.e., the effluent formed via passage through third, fourth, fifth, and sixth reforming reactors, 120C, 120D, 120E, and 120F, and associated furnaces, 110C, 110D, 110E, and 110F), is subjected to heat exchange in feed/effluent heat exchanger 107A, and combined with the reformer product from the first reforming reactor series for introduction into the hydrogen separator 135.

In embodiments, the molar ratio of hydrogen to hydrocarbon in at least one of the reactors within the plurality of reactors of the second series of reactors is less than a molar ratio of hydrogen to hydrocarbon in a corresponding reactor of a process employing a reforming reactor system comprising a single series of reactors operated without inter-series hydrogen separation. In embodiments, the molar ratio of hydrogen to hydrocarbon in a final reactor of the second series of reactors is less than about 3:1, at constant conversion, and the molar ratio of hydrogen to hydrocarbon to a first reactor of the first series of reactors is in the range of from about 1.5:1 to about 2:1. In embodiments, a partial pressure of hydrogen in at least one of the reactors within the plurality of reactors of the second series of reactors is less than a partial pressure of hydrogen in a corresponding reactor of a process employing a reforming reactor system comprising a single series of reactors operated without inter-series hydrogen separation.

In embodiments, inter-series hydrogen removal according to this disclosure provides a selectivity to benzene, toluene, and xylenes (BTX) that is greater than a selectivity to BTX provided by an equivalent process employing a reforming reactor system comprising a single series of reactors operated without inter-series hydrogen separation.

In embodiments, the reforming method comprises directing a portion of the hydrocarbon feed to form a supplemental feed, and introducing the supplemental feed into at least one reactor downstream of the first reactor in the reactor series, thus bypassing the first reactor with the portion of the hydrocarbon feed, and introducing a remainder portion of the hydrocarbon feed into the first reactor of the reactor series.

In certain aspects, the reforming methodologies and processes comprise operating a plurality of reactors in a reactor series to produce a reactor series effluent comprising an aromatic hydrocarbon from a hydrocarbon feed comprising a hydrocarbon, wherein operating the plurality of reactors comprises directing a portion of the hydrocarbon feed to form a supplemental feed and introducing the supplemental feed into at least one reactor downstream of the first reactor in the reactor series, thus bypassing the first reactor with the portion of the hydrocarbon feed, and introducing a remainder portion of the hydrocarbon feed into the first reactor of the reactor series, wherein each of the reactors within the plurality of reactors contains a catalyst capable of catalyzing the reaction of at least a portion of the hydrocarbon in the hydrocarbon feed into the aromatic hydrocarbon, thus providing the reactor series effluent.

A description of a method of a reforming method according to this disclosure, which may provide enhanced control of hydrogen partial pressure throughout a reforming reactor train via staggering of hydrocarbon feed introduction, will now be made with reference to FIG. 2. As noted hereinabove, like numerals are utilized in the figures to represent like apparatus.

Fresh hydrocarbon feed containing hydrocarbons to be reformed, and as described above with reference to FIG. 1, is introduced via fresh hydrocarbon feed line 205A into first feed/effluent heat exchanger 207A, wherein heat exchange with the reforming reactor effluent in second feed/effluent heat exchanger outlet line 225 raises the temperature thereof. Heat exchanged hydrocarbon feed is removed from first feed/effluent heat exchanger 207A via first heat exchanger hydrocarbon feed outlet line 206A. Piping 208/208'/208"/208''' is configured to divert a portion of the hydrocarbon feed, such that it can bypass (at least) first reforming reactor 220A. In a non-limiting example, a portion of the hydrocarbon feed may be directed via piping 208 (e.g., 208, 208', 208", and/or 208''') and 208A to second reforming reactor 220B via combination, upstream of second furnace 210B, with the first reforming reactor effluent removed from first reforming reactor 220A via first reforming reactor effluent line 215A; a portion of the hydrocarbon feed may be directed via piping 208 (e.g., 208, 208', 208", and/or 208''') and 208B to third reforming reactor 220C via combination, upstream of third furnace 210C, with the second reforming reactor effluent removed from second reforming reactor 220B via second reforming reactor effluent line 215B; a portion of the hydrocarbon feed may be directed via piping 208 (e.g., 208, 208', 208", and/or 208''') and 208C to fourth reforming reactor 220D via combination, upstream of fourth furnace 210D, with the third reforming reactor effluent removed from third reforming reactor 220C via third reforming reactor effluent line 215C; a portion of the hydrocarbon feed may be directed via piping 208 (e.g., 208, 208', 208", and/or 208''') and 208D to fifth reforming reactor 220E via combination, upstream of fifth furnace 210E, with the fourth reforming reactor effluent removed from fourth reforming reactor 220D via fourth reforming reactor effluent line 215D; a portion of the hydrocarbon feed may be directed via piping 208 (e.g., 208, 208', 208", and/or 208''') and 208E to sixth reforming reactor 220F via combination, upstream of sixth furnace 210F, with the fifth reforming reactor effluent removed from fifth reforming reactor 220E via fifth reforming reactor effluent line 215E; or a combination thereof.

The method may further comprise controlling a portion of the supplemental feed introduced to each reactor downstream of the first reactor such that an influent to each reactor of the plurality of reactors has a desired molar ratio of hydrogen to hydrocarbon, the effluent from each reactor of the plurality of reactors has a desired molar ratio of hydrogen to hydrocarbon, or both. In embodiments, the desired molar ratio of hydrogen to hydrocarbon in the influent is in the range of from about 1.5:1 to about 2:1. In embodiments, the desired molar ratio of hydrogen to hydrocarbon of the effluent is less than about 3:1.

In embodiments, the hydrocarbon feed is split before (i.e., piping 208 diverts a portion thereof prior to) the addition of hydrogen thereto. For example, the hydrocarbon feed may be split upstream of sulfur removal apparatus 209, but downstream of the first feed effluent heat exchanger 207A. The remaining, non-diverted portion of the hydrocarbon feed is combined with hydrogen introduced into heat exchanged hydrocarbon feed line 206A via hydrogen recycle line 239A, and introduced into sulfur removal apparatus 209.

Sulfur removal system 209 may be used to reduce the amount of sulfur in the hydrocarbon stream, and may comprise any suitable sulfur removal system capable of removing sulfur from the hydrocarbon stream. In an embodiment, sulfur removal system 209 comprises one or more vessels that allow the hydrocarbon stream to pass as a fluid through a sulfur removal system comprising a sulfur converter, containing a Group VIII metal, and a sulfur adsorber. Sulfur removal system 209 may also function a precaution or backup in case any upstream hydrotreating system fails or experiences an operating upset. After passing through sulfur removal system 209, the hydrocarbon stream may pass via sulfur-reduced hydrocarbon feed line 205B to a second feed/effluent heat exchanger 207B designed to further adjust the temperature of the hydrocarbon stream. The hydrocarbon stream may then pass via line 206B to the reforming reactor section of reforming system 200.

Sulfur-reduced hydrocarbon feed containing hydrogen is introduced via sulfur-reduced hydrocarbon feed line 205B into second feed/effluent heat exchanger 207B. Thus, in such embodiments, the fraction of the feed mixed with hydrogen can be subjected to sulfur removal in sulfur removal apparatus 209, heat exchange within second feed/effluent heat exchanger 207B, and temperature elevation in first furnace 210A, prior to introduction into first reforming reactor 220A via first furnace outlet line 212A. As the hydrocarbon feed is converted to aromatics within the first reforming reactor 220A, more hydrogen is produced, thus increasing the $H_2/HC$ mole ratio. Diverted feed containing no added hydrogen, is added to reformer product within the reactor train. The diverted feed may be added upstream of the furnace(s). Diverted hydrocarbon feed can be introduced into the reactor series after each reforming reactor, after one of the reforming reactors downstream of the first reforming reactor, or after a plurality of reactors downstream of the first reforming reactor and upstream of the last reforming reactor of the system.

Via staggering of the hydrocarbon feed injection/introduction points, hydrocarbon feed containing no added hydrogen can be added in quantities that bring the molar ratio of $H_2/HC$ back to a desired level. Reactor sizing can be adjusted in order to compensate for the increasing hydrocarbon load in later reactors. An additional advantage provided via staggering of the hydrocarbon feed is that significantly less hydrogen is recycled back with the feed, thus lowering compressor costs, for example the cost of compressor 238. For existing plants, where capacity may be constrained by the recycle compressor, staggering of the hydrocarbon feed as described herein may allow for debottlenecking.

As shown in FIG. 2, the twice heat exchanged hydrocarbon feed stream leaving second feed/effluent heat exchanger 207B proceeds through the reactor train in a serial flow scheme. Prior to each reforming reactor 220A, 220B, 220C, 220D, 220E, 220F, the hydrocarbon feedstream passes through an associated furnace 210A, 210B, 210C, 210D, 210E, 210F, respectively, to raise the temperature of the feed back to a desired reactor inlet temperature. Once heated via an upstream furnace, the heated feed is introduced into the associated downstream reforming reactor until the reforming product passes out of the final reactor in the series as the reforming effluent stream 215F, which passes through second feed/effluent heat exchanger 207B and first feed/effluent heat exchanger 207A, in which it is cooled via heat exchange with the fresh hydrocarbon feed in lines 205B and 205A, respectively, before being introduced via line 230 to the downstream processing units.

The reformer effluent of the last reforming reactor (sixth reforming reactor 220F in the embodiment of FIG. 2) can be utilized to increase the temperature of the hydrocarbon feed via heat exchange therewith (in second feed/effluent heat exchanger 207B, and first feed/effluent heat exchanger 207A of FIG. 2). As discussed with reference to the embodiment of FIG. 1, hydrogen may be separated from the reformer effluent. For example, reformer effluent may be introduced into hydrogen separator 235 via first feed/effluent heat exchanger reformer effluent outlet line 230. In hydrogen separator 235, hydrogen is separated from the reformer effluent, thus providing hydrogen-reduced effluent. Separated hydrogen is introduced via separated hydrogen outlet line 237 into compressor 238, which compresses the net gas removed via hydrogen separator 235. Compressed gas is removed from compressor 238 via compressor outlet line 239. A portion of the compressed gas can be removed from the system via outlet line 239B, and a portion of the hydrogen can be combined, via hydrogen recycle line 239A, with hydrocarbon feed for introduction into the first reforming reactor 220A.

As described with reference to the embodiment of FIG. 1, one or more components can be removed from the hydrogen-reduced reformer product. For example, the hydrogen-reduced reformer product can be introduced, via hydrogen separator bottoms outlet line 236, into a stabilizer 240, whereby light hydrocarbons can be removed therefrom. Light hydrocarbons can be removed from stabilizer 240 via stabilizer light hydrocarbon outlet line 245, and a $C_{5+}$ reformer product removed from stabilizer 240 via stabilizer bottoms outlet line 250. $C_{7+}$ components can be removed from the $C_{5+}$ reformer product, by introduction of the $C_{5+}$ reformer product from stabilizer 240 into $C_6/C_7$ splitter 255 via stabilizer bottoms outlet line 250. $C_{7+}$ hydrocarbons can be removed from $C_6/C_7$ splitter 255 via $C_{7+}$ outlet line 260, and a $C_{6-}$ reformer product removed from $C_6/C_7$ splitter 255 via $C_{6-}$ outlet line 265. Benzene can be removed from the $C_{6-}$ reformer product via introduction thereof into EDU 270 via $C_{6-}$ product outlet line 265.

A separated benzene product can be removed from EDU 270 via benzene product outlet line 275, and a benzene-reduced $C_{6-}$ reformer product removed from EDU 270 via EDU outlet line 280. In embodiments, the benzene-reduced $C_{6-}$ product is utilized as mogas. In embodiments, as with the embodiment of FIG. 1, the benzene-reduced $C_{6-}$ product is introduced into a DMB column, wherein DMBs are removed therefrom. The resulting DMB-reduced product comprising convertible $C_6$ hydrocarbons may be introduced into one or more of the reforming reactors, for further production of aromatics therefrom. For example, convertible $C_6$ hydrocarbons may be introduced into first reforming reactor 220A via combination with hydrocarbon feed in line 205B, and/or may be introduced into one or more reforming reactors downstream of the first reforming reactor via piping 208. In embodiments, all of the hydrocarbon in line 205A/206A is introduced into first reforming reactor 220A, and the hydrocarbon feed introduced into one or more of the reforming reactors downstream of the first reforming reactor comprises convertible $C_6$ hydrocarbon obtained by separation of hydrogen and one or more of light hydrocarbons, $C_{7+}$ hydrocarbons, benzene, and/or DMBs from the hydrogen-reduced reformer product. In this manner, all of the fresh hydrocarbon feed can be passed through sulfur removal apparatus 209 for the removal of sulfur from the feedstream.

With reference to FIG. 1, in embodiments, inter-series hydrogen separation may be combined with staggered hydrocarbon feed introduction, as further described with reference to the embodiment of FIG. 2. Thus, for example, hydrogen separation via hydrogen separator 235, light hydrocarbon removal via stabilizer 240, $C_6/C_7$ splitting via $C_6/C_7$ splitter 255, benzene separation via EDU 270, and/or DMB removal via a DMB column 185, may be positioned and operated to remove hydrogen, light hydrocarbons, $C_{7+}$ hydrocarbons, benzene, and/or DMBs from the effluent product of a first stage, series, or set of reforming reactors prior to introduction thereof into a second stage, series, or set of reforming reactors. In embodiments, a method comprising staggered hydrocarbon feed introduction as described herein may further comprise removing a non-convertible hydrocarbon from the reactor series effluent to produce a second hydrocarbon stream, and recycling the second hydrocarbon stream to the reactor series. The second hydrocarbon stream may be utilized as the (or at least a portion of the) portion of the hydrocarbon feed that bypasses the first reactor.

Embodiments of this disclosure provide for systems and methods whereby hydrogen partial pressure in one or more reforming reactors can be more consistently maintained via hydrogen removal from a reforming product of a first reactor series upstream of at least one reforming reactor of a second series of reforming reactors. Intermediate removal of hydrogen may enhance selectivity. The disclosed system and method, in embodiments, provide for removal of branched non-convertibles and/or substituted aromatics between a first and second series of reforming reactors. Via such systems and methods, such branched non-convertibles and/or substituted aromatics can be removed before undergoing substantial cracking. Intermediate removal of branched compounds may provide for enhanced value of a resulting mogas product. In embodiments, the disclosed system and method employ a first series of reforming reactors which is operated under less severe operating conditions than a second series of reforming reactors. Operation of the reactors of the first and second series at different conditions may be utilized to maximize selectivity. Furthermore, operation of the first reforming reactor series at a lower temperature may allow for the reduction or elimination of coatings on the surfaces of the piping and equipment contacting the hydrocarbon stream. The reduction or elimination of such metal protective coatings may represent a significant cost savings in the overall system.

In embodiments, a dehexanizer is not utilized in a feed preparation section since inter-stage heavy component removal according to embodiments of this disclosure enables the system and method to accommodate heavier feeds than conventional reforming systems and methods. In embodiments, the second set or series of reactors (e.g., third through sixth reforming reactors 120C, 120D, 120E, and 120F of the embodiment of FIG. 1) can be scaled down relative to a conventional reactor series in which hydrogen removal is performed solely and subsequent to introduction to the final reforming reactor, since there is less flow passing therethrough. Catalyst consumption may be reduced via the disclosed system and method, as deactivation rates may be lower at reduced operating conditions of the first series of reactors, and the second set of reactors can be smaller relative to the same reactors of a conventional single series reforming system and method.

The selectivity provided via the herein-disclosed system and method comprising inter-stage hydrogen and component removal may be higher, because cracking precursors are removed before the higher temperature reactors of the second reactor series. Selectivity may also be higher due to the reduced hydrogen partial pressure provided via the inter-series hydrogen removal. Although the hydrogen separator, $C_6/C_7$ splitter, and the EDU may be larger to handle the additional flow thereto, a charge pump may be utilized to pump the convertible $C_6$ hydrocarbons to the second reforming reactor series, and an extra heat exchanger (i.e., inter-stage effluent heat exchanger 107B) would be utilized to transfer heat to the convertible $C_6$ stream prior to introduction thereof into the second series of reforming reactors, any additional cost thereof may be offset by the enhanced selectivity, reduced catalyst consumption, and potential utilization of heavier feeds and/or less durable equipment within the first reactor series provided via the herein-disclosed system and method.

Embodiments of this disclosure provide systems and methods whereby hydrogen partial pressure in one or more reforming reactors can be more consistently maintained via staggering the introduction of a substantially hydrogen-free hydrocarbon feed, whereby at least a portion of the hydrocarbon feed bypasses (at least) the first reforming reactor. The substantially hydrogen-free hydrocarbon feed can be obtained by diverting a portion of the hydrocarbon feed upstream of a sulfur removal apparatus (and prior to introduction of hydrogen to a feed thereto), moving the sulfur removal apparatus or SCA upstream, and/or recycling as hydrocarbon feed a hydrogen-reduced reformer product comprising convertible $C_6$ hydrocarbons obtained downstream of a hydrogen separator. It has been unexpectedly discovered that utilization of multiple feed injection points can significantly enhance reforming catalyst performance (e.g., activity and/or $C_{5+}$ selectivity), provide enhanced $C_{5+}$ selectivity, and/or reduce (hydrogen) compressor costs and possibly debottlenecking, relative to an equivalent process in which a portion of the hydrocarbon feed is not introduced downstream of the first reactor in the reactor series. The utilization of multiple hydrocarbon feed introduction locations may also incur only low capital costs to implement. To further illustrate various illustrative embodiments of the present disclosure, the following examples are provided.

EXAMPLE

The following example illustrates embodiments of the disclosure and is not intended to limit the specification or the claims in any manner.

Example 1

Figure 3:
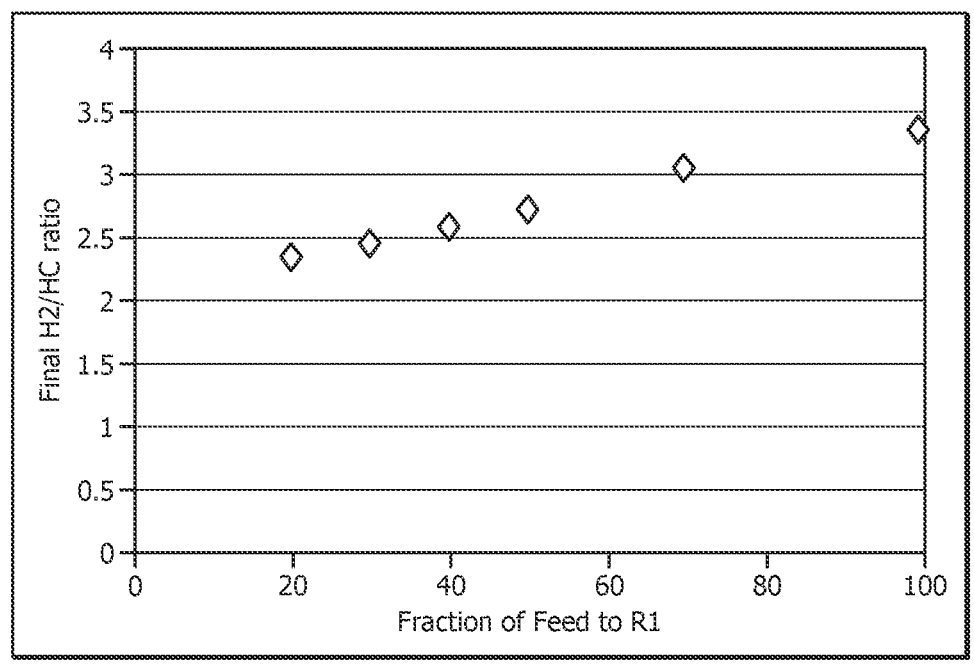
FIG. 3 is a graphical representation of final hydrogen to hydrocarbon molar ratio as a function of a fraction of hydrocarbon feed being introduced into a first reforming reactor of a reforming system in accordance with embodiments of the present disclosure.

The process of FIG. 2 was modeled to determine the molar ratio of hydrogen to hydrocarbon as a function of the fraction of hydrocarbon feed being introduced to first reforming reactor 220A. An inlet hydrogen to hydrocarbon molar ratio of 1.46 was used. It was assumed that the extent of reaction was the same for all data points. FIG. 3 is a graph of the modeled molar ratios of hydrogen to hydrocarbon coming out of the final reforming reactor, sixth reforming reactor 220F, as a function of the feed fraction introduced into first reforming reactor 220A. As can be seen in FIG. 3, the final molar ratio of hydrogen to hydrocarbon can be significantly lowered by staggering the hydrocarbon introduction such that not all of the hydrocarbon feed is introduced into the first reforming reactor. Production of hydrogen during reforming results in a final molar ratio of hydrogen to hydrocarbon that is above 1.46, however, feeding substantially hydrogen-free hydrocarbon into the system downstream of the first reforming reactor can significantly reduce the final molar ratio of hydrogen to hydrocarbon out of the last reforming reactor of the series.

The particular embodiments disclosed herein are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having," "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined in the disclosure.

What is claimed is:

1. A process for operating a reforming reactor system, the process comprising:
    operating a first series of reactors, wherein the first series of reactors comprises a plurality of reactors, and wherein each reactor within the plurality of reactors in the first series of reactors contains a catalyst comprising at least one Group VIII metal, a zeolitic support, and at least one halogen and capable of catalyzing the reaction of at least a portion of hydrocarbons in a hydrocarbon feed into aromatic hydrocarbons, thus providing a first reactor series effluent comprising the aromatic hydrocarbons, unreacted hydrocarbons, and hydrogen;
    separating hydrogen from the first reactor series effluent, thus providing hydrogen and a reduced-hydrogen first reactor series effluent; and
    operating a second series of reactors;
    wherein the second series of reactors comprises a plurality of reactors,
    wherein each reactor within the plurality of reactors in the second series of reactors contains a catalyst comprising at least one Group VIII metal, a zeolitic support, and at least one halogen capable of converting unreacted hydrocarbons in the reduced-hydrogen first reactor series effluent into the aromatic hydrocarbons, and
    wherein a fouling rate of the catalyst in any one of the reactors within the plurality of reactors in the first series of reactors is less than a fouling rate of the catalyst in any one of the reactors within the plurality of reactors in the second series of reactors.

2. The process of claim 1, further comprising operating at least one of the reactors within the plurality of reactors in the first series of reactors at a lower severity than at least one of the reactors within the plurality of reactors in the second series of reactors;
    wherein the lower severity is selected from the group consisting of a lower average catalyst bed temperature, a lower reactor endotherm for at least one reactor of the plurality of reactors in the first series of reactors over the course of a run that is at least 40° C. less than an average catalyst bed temperature, and a lower reactor endotherm for at least one reactor within the plurality of reactors in the second series of reactors over the course of the run.

3. The process of claim 1, wherein the hydrocarbon feed comprises greater than about 10 volume percent of hydrocarbons containing eight or more carbon atoms ($C_8^+$).

4. The process of claim 1, wherein a molar ratio of hydrogen to hydrocarbon in at least one of the reactors within the plurality of reactors of the second series of reactors is less than a molar ratio of hydrogen to hydrocarbon in a corresponding reactor of a process employing a reforming reactor system comprising a single series of reactors operated without inter-series hydrogen separation.

5. The process of claim 4, wherein the molar ratio of hydrogen to hydrocarbon in a final reactor of the second series of reactors is less than about 3:1, at constant conversion, and wherein the molar ratio of hydrogen to hydrocarbon to a first reactor of the first series of reactors is in the range of from about 1.5:1 to about 2:1.

6. The process of claim 1, wherein a partial pressure of hydrogen in at least one of the reactors within the plurality of reactors of the second series of reactors is less than a partial pressure of hydrogen in a corresponding reactor of a process employing a reforming reactor system comprising a single series of reactors operated without inter-series hydrogen separation.

7. The process of claim 1, wherein a selectivity to benzene, toluene, and xylenes (BTX) is greater than a selectivity to BTX provided by an equivalent process employing a reforming reactor system comprising a single series of reactors operated without inter-series hydrogen separation.

8. The process of claim 1, wherein the reduced-hydrogen first reactor series effluent comprises a non-convertible $C_6$ hydrocarbon, and wherein the process further comprises:
separating the non-convertible $C_6$ hydrocarbon from the reduced-hydrogen first reactor series effluent to produce a second hydrocarbon stream;
   introducing the second hydrocarbon stream to the second series of reactors via a charge pump, wherein the second hydrocarbon stream comprises a greater concentration of convertible $C_6$ hydrocarbons than the reduced-hydrogen first reactor series effluent; and
   heating the second hydrocarbon stream via heat exchange with the first reactor series effluent prior to introduction of the second hydrocarbon stream into the second series of reactors and prior to separating hydrogen from the first reactor series effluent.

9. A reforming reactor system comprising:
a first reactor series comprising a plurality of reactors, wherein each of the reactors within the plurality of reactors of the first reactor series contains a catalyst comprising at least one Group VIII metal, a zeolitic support, and at least one halogen and capable of catalyzing the reaction of at least a portion of a hydrocarbon in a hydrocarbon feed into an aromatic hydrocarbon, thus providing a first reactor series effluent comprising the aromatic hydrocarbon, unreacted hydrocarbon, and hydrogen;
a low-pressure separator configured to separate hydrogen from the first reactor series effluent, thus providing hydrogen and a reduced-hydrogen first reactor series effluent; and
a second reactor series comprising a plurality of reactors, and
an apparatus configured to separate a non-convertible $C_6$ hydrocarbon from the reduced-hydrogen first reactor series effluent to produce a second hydrocarbon stream, wherein the second hydrocarbon stream comprises a greater concentration of convertible $C_6$ hydrocarbons than the reduced-hydrogen first reactor series effluent, and (a) a charge pump operable to introduce the second hydrocarbon stream to the second reactor series; (b) a heat exchange apparatus configured to transfer heat between the second hydrocarbon stream and the first reactor series effluent prior to introduction of the second hydrocarbon stream into the second reactor series and prior to separating hydrogen from the first reactor series effluent via the hydrogen separation apparatus; or both (a) and (b), and
wherein each reactor of the second reactor series contains a catalyst comprising at least one Group VIII metal, a zeolitic support, and at least one halogen and capable of catalyzing the reaction of at least a portion of the unreacted hydrocarbon in the reduced-hydrogen first reactor series effluent into the aromatic hydrocarbon.

10. The reforming reactor system of claim 9, wherein at least one of the reactors within the plurality of reactors in the first series of reactors is configured to operate at a lower severity than at least one of the reactors within the plurality of reactors in the second series of reactors;
   wherein the lower severity is selected from the group consisting of a lower average catalyst bed temperature, a lower reactor endotherm for at least one reactor of the plurality of reactors in the first series of reactors over the course of a run that is at least 40° C. less than an average catalyst bed temperature, and a lower reactor endotherm for at least one reactor within the plurality of reactors in the second series of reactors over the course of the run.

11. The reforming reactor system of claim 9, wherein a fouling rate of the catalyst in any one of the reactors within the plurality of reactors in the first series of reactors is less than a fouling rate of the catalyst in any one of the reactors within the plurality of reactors in the second series of reactors.

12. A process for operating a reforming reactor system, the process comprising:
   operating a plurality of reactors in a reactor series to produce a reactor series effluent comprising an aromatic hydrocarbon from a hydrocarbon feed comprising a hydrocarbon, wherein operating the plurality of reactors comprises directing a portion of the hydrocarbon feed to form a supplemental feed, introducing the supplemental feed into at least one reactor downstream of the first reactor in the reactor series, thus bypassing the first reactor with the portion of the hydrocarbon feed, and introducing a remainder portion of the hydrocarbon feed into the first reactor of the reactor series, wherein each of the reactors within the plurality of reactors contains a catalyst comprising at least one Group VIII metal, a zeolitic support, and at least one halogen and capable of catalyzing the reaction of at least a portion of the hydrocarbon in the hydrocarbon feed into the aromatic hydrocarbon, thus providing the reactor series effluent.

13. The process of claim 12, wherein each reactor of the reactor series is preceded by an associated furnace, and wherein the supplemental feed is introduced upstream of the furnace preceding the at least one downstream reactor into which the supplemental feed is introduced.

14. The process of claim 12, wherein each reactor of the reactor series is preceded by an associated furnace, and wherein operating the plurality of reactors further comprises introducing the supplemental feed directly upstream of each furnace associated with each reactor downstream of the first reactor.

15. The process of claim 12, further comprising controlling a portion of the supplemental feed introduced to each reactor downstream of the first reactor such that an influent to each reactor of the plurality of reactors has a desired molar ratio of hydrogen to hydrocarbon, the effluent from each reactor of the plurality of reactors has a desired molar ratio of hydrogen to hydrocarbon, or both.

16. The process of claim 15, wherein the desired molar ratio of the influent is in the range of from about 1.5:1 to about 2:1, wherein the desired molar ratio of the effluent is less than about 3:1, or both.

17. The process of claim 12, wherein directing a portion of the hydrocarbon feed to form the supplemental feed is performed upstream of a sulfur removal apparatus, and further comprising introducing the remainder of the hydrocarbon feed to the sulfur removal apparatus prior to introduction thereof into the first reactor.

18. The process of claim 12, further comprising separating hydrogen from the reactor series effluent, and combining a portion of the separated hydrogen with the remainder portion of the hydrocarbon feed, after compressing the separated hydrogen, such that the combination provides a first reactor feed having a molar ratio of hydrogen to hydrocarbon in the range of from about 1.5:1 to about 2.0:1.

19. The process of claim 18, wherein compressing the separated hydrogen and combining the portion of the separated hydrogen with the remainder portion of the hydrocarbon feed, after compressing the separated hydrogen, requires less compressor capacity than an equivalent process employing a reforming reactor system in which all of the hydrocarbon feed is introduced into the first reactor of the reactor series.

20. A process for operating a reforming reactor system, the process comprising:
  operating a first series of reactors, wherein the first series of reactors comprises a plurality of reactors, and wherein each reactor within the plurality of reactors in the first series of reactors contains a catalyst comprising at least one Group VIII metal, a zeolitic support, and at least one halogen and capable of catalyzing the reaction of at least a portion of hydrocarbons in a hydrocarbon feed into aromatic hydrocarbons, thus providing a first reactor series effluent comprising the aromatic hydrocarbons, unreacted hydrocarbons, and hydrogen;
  separating hydrogen from the first reactor series effluent, thus providing hydrogen and a reduced-hydrogen first reactor series effluent; and
  operating a second series of reactors;
  wherein the second series of reactors comprises a plurality of reactors,
  wherein each reactor within the plurality of reactors in the second series of reactors contains a catalyst comprising at least one Group VIII metal, a zeolitic support, and at least one halogen capable of converting unreacted hydrocarbons in the reduced-hydrogen first reactor series effluent into the aromatic hydrocarbons,
  wherein the reduced-hydrogen first reactor series effluent comprises a non-convertible $C_6$ hydrocarbon, and
  wherein the process further comprises: separating the non-convertible $C_6$ hydrocarbon from the reduced-hydrogen first reactor series effluent to produce a second hydrocarbon stream;
  introducing the second hydrocarbon stream to the second series of reactors via a charge pump, wherein the second hydrocarbon stream comprises a greater concentration of convertible $C_6$ hydrocarbons than the reduced-hydrogen first reactor series effluent; and
  heating the second hydrocarbon stream via heat exchange with the first reactor series effluent prior to introduction of the second hydrocarbon stream into the second series of reactors and prior to separating hydrogen from the first reactor series effluent.

* * * * *